United States Patent [19]

Ogata et al.

[11] Patent Number: 5,390,284
[45] Date of Patent: Feb. 14, 1995

[54] LEARNING METHOD AND APPARATUS FOR NEURAL NETWORKS AND SIMULATOR WITH NEURAL NETWORK

[75] Inventors: Hisao Ogata, Kokubunji; Hiroshi Sakou, Shiki; Masahiro Abe, Iruma; Junichi Higashino, Kodaira, all of Japan

[73] Assignee: Hitachi, Ltd., Tokyo, Japan

[21] Appl. No.: 903,243

[22] Filed: Jun. 23, 1992

[30] Foreign Application Priority Data

Jun. 27, 1991 [JP] Japan ................................. 3-182989

[51] Int. Cl.$^6$ ............................................. G06F 15/18
[52] U.S. Cl. ................................................ 395/23
[58] Field of Search ............................ 395/20, 21, 23

[56] References Cited

U.S. PATENT DOCUMENTS

| | | | |
|---|---|---|---|
| 5,073,867 | 12/1991 | Murphy et al. | 395/27 |
| 5,093,899 | 3/1992 | Hiraiwa | 395/23 |
| 5,168,550 | 12/1992 | Sakaue et al. | 395/23 |
| 5,228,113 | 7/1993 | Shelton | 395/23 |

FOREIGN PATENT DOCUMENTS

| | | |
|---|---|---|
| 2-222061 | 2/1990 | Japan . |
| 2-222062 | 2/1990 | Japan . |
| 2-226461 | 2/1990 | Japan . |

OTHER PUBLICATIONS

Woodland, "Weight Limiting, Weight Quantisation, & Generalisation in Multi-Layer Perceptions," First IEE Int'l Conf on Artificial NN, pp. 297-300 Oct. 16-18, 1989.

Ghiselli-Crippa et al, "A Fast Neural Net Training Algorithm and its Application to Voice-Unvoiced-Silence Clasification of Speech", Int'l Conf on Acoustics, Speech & Sig Proc, May 14-17 1991 vol. 1 pp. 441-444.

Garcia et al, "Optimization of Planar Devices by the Finite Element Method", IEEE Transactions on Microwave Theory and Techniques, Jan. 1990 vol. 38 ISS 1 pp. 48-53.

Kruschke et al, "Benefits of Gain: Speeded Learning and Minimal Hidden Layers in Back-Propagation Networks" IEEE Transaction on Systems, Man and Cybernetics, Jan.-Feb. 1991 vol. 21 ISS 1 pp. 273-280.

Goryn et al, "Conjugate Gradient Learning Algorithms For Multi-Layer Perceptions", Proc of 32nd Midwest Symposium on Circuits & Systems, Aug. 14-16 1989 vol. 2 pp. 736-739.

Jones et al, "Optimization Techniques Applied to Neural Networks: Line Search Implementation for Back-Propagation", Int'l Joint Conf on Neural Networks, Jun. 17-21 1990, vol. 3 pp. 933-939.

Rumelhart, D. E., et al. Parallel Distributed Processing Explorations in the Microstructure of Cognition Volume 1: Foundations, The MIT Press, Cambridge Mass., 1988, pp. 322-331. (English).

Makram-Ebeid, S., et al., "A Rationalized Error Back-Propagation Learning Algorithm," IJCNN, 1989, pp. II-373-380. (English).

*Primary Examiner*—Allen R. MacDonald
*Assistant Examiner*—Stuart B. Shapiro
*Attorney, Agent, or Firm*—Fay, Sharpe, Beall, Fagan, Minnich & McKee

[57] ABSTRACT

A neural network (100) has an input layer, a hidden layer, and an output layer. The neural network stores weight values which operate on data input at the input layer to generate output data at the output layer. An error computing unit (87) receives the output data and compares it with desired output data from a learning data storage unit (105) to calculate error values representing the difference. An error gradient computing unit (81) calculates an error gradient, i.e. rate and direction of error change. A ratio computing unit (82) computes a ratio or percentage of a prior conjugate vector and combines the ratio with the error gradient. A conjugate vector computing unit (83) generates a present line search conjugate vector from the error gradient value and a previously calculated line search gradient vector. A line search computing unit (95) includes a weight computing unit (88) which calculates a weight correction value. The weight correction value is compared (18) with a preselected maximum or upper limit correction value ($\kappa$). The line search computing unit (95) limits adjustment of the weight values stored in the neural network in accordance with the maximum weight correction value.

12 Claims, 22 Drawing Sheets

CALCULATION SEQUENCE OF STEEPEST DESCENT GRADIENT

MINIMUM VALUE SEARCH THROUGH BACK-PROPAGATION

WEIGHT (W) DEPENDENCY OF SIGMOID FUNCTION

WEIGHT (W) DEPENDENCY OF DIFFERENTIATED SIGMOID FUNCTION

BEFORE LEARNING

AFTER LEARNING

OVERALL PROCEDURE OF EMBODIMENT

LINE SEARCH PAD WITH UPPER LIMIT OF WEIGHT INCREASE $$E(\eta_q) = E(W + \eta_q \, dl)$$
$$W/(\eta) = W + \eta \, dl$$

FIG. 15
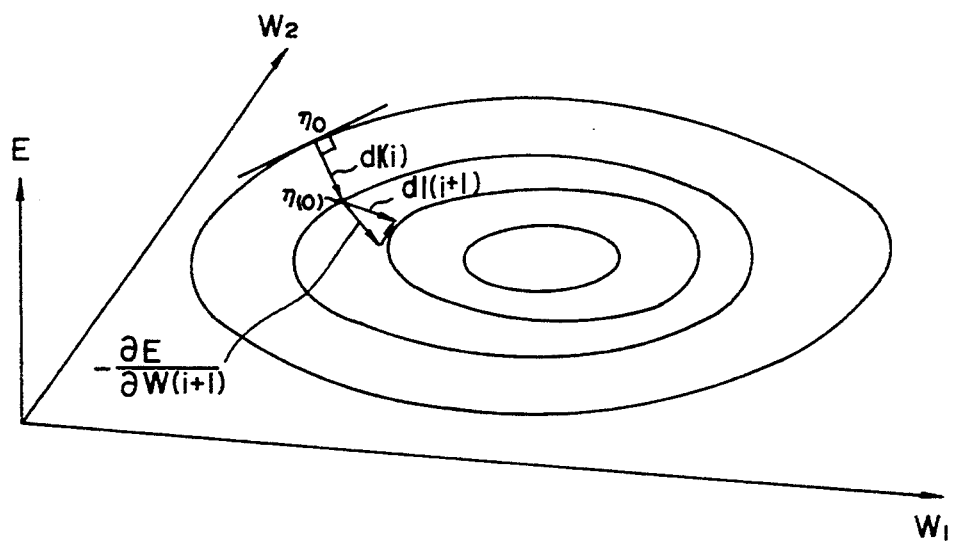
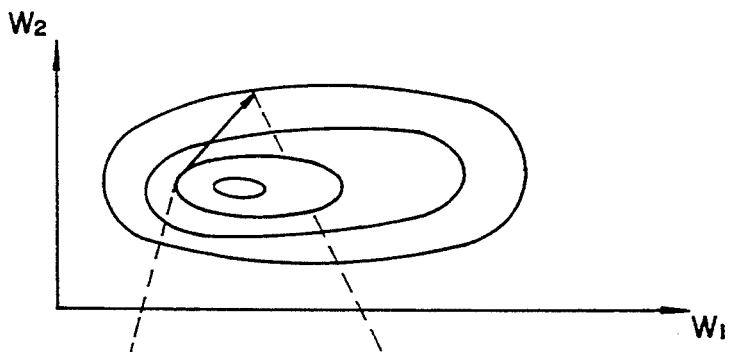
FIG. 16A
FIG. 16B
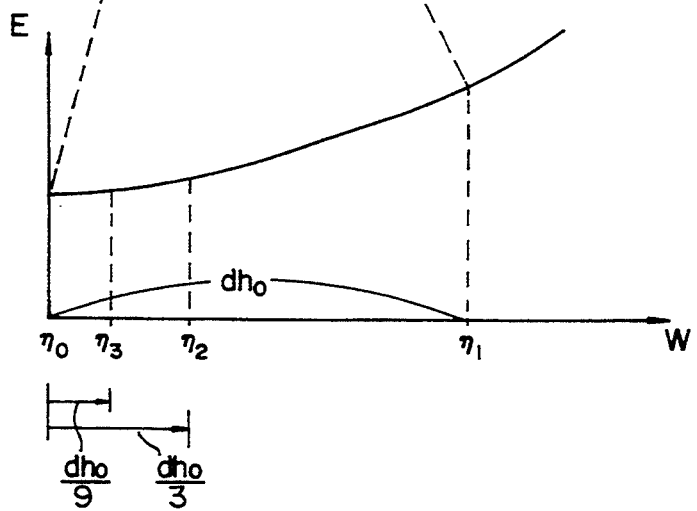

FIG. 22

BENCH MARK TEST RESULTS

|  | 16 bit encoder | CHARACTER RECOGNITION (0~9) |
|---|---|---|
| NUMBER OF INPUT LAYER UNITS | 16 | 225 |
| NUMBER OF HIDDEN LAYER UNITS | 5 | 128 |
| NUMBER OF OUTPUT LAYER UNITS | 16 | 11 |
| NUMBER OF LEARNING PATTERNS | 16 | 1377 |
| NUMBER OF LEARNING TIMES | 10 | 1 |

FIG.23A  FIG.23B
16-BIT ENCODER
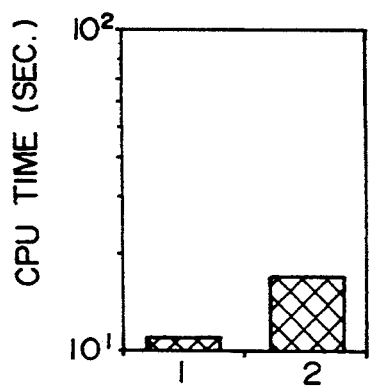
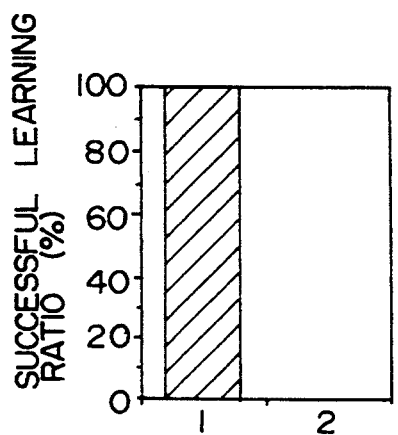
FIG.24A  FIG.24B
CHARACTER RECOGNITION (0 TO 9, 1377 PATTERNS)
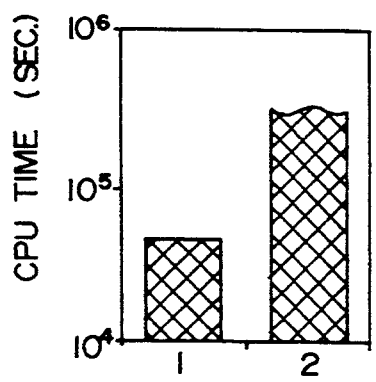

INPUT LAYER    HIDDEN LAYER    OUTPUT LAYER

RECURRENT NETWORK

LEARNING METHOD AND APPARATUS FOR NEURAL NETWORKS AND SIMULATOR WITH NEURAL NETWORK

CROSS-REFERENCE OF RELATED APPLICATION

The present application relates to U.S. patent application Ser. No. 07/833,127, entitled "Method of and system for controlling learning in neural network" filed on Feb. 10, 1992, in the name of Hisao Ogata et al.

BACKGROUND OF THE INVENTION

1. Field of the Invention

The present invention relates to a learning method and apparatus for learning weights of a neural network by using learning patterns, to be used for pattern recognition, data compression and the like. The present invention relates also to a simulator using a neural network.

2. Description of the Related Art

A neural network is a simplified network modeled after a human brain having a great number of nerve cell neurons coupled by synapses which allow signals to pass uni-directionally. Signals are transmitted to neurons via synapses. Various information processing can be made by properly adjusting the resistances of synapses, i.e., weights of synapses. Each neuron receives outputs from preceding neurons via weighted synapses, and the sum of received outputs is modified by a non-linear response function to output it to other succeeding neurons.

The structure of a neural network includes two typical types, i.e., a totally interconnected type and a multi-layer type. The former type is suited for the solution of optimization problems, and the latter is suited for the solution of recognition problems such as pattern recognition problems.

In using a multi-layer type neural network for pattern recognition and data compression, it is necessary to provide learning patterns composed of pairs of input and output patterns and learn in advance weights of the network prior to using it, in order that the network can output correct signals. For this purpose, an optimization method called back-propagation is generally used. This method is discussed, for example, in "Parallel Distributed Processing", pp. 322 to 331, D. E. Runelhart, 1988.

The characteristic features of this method reside in that a continuous non-linear function such as a sigmoid function is used as a non-linear neuron response function, and that weights are renewed by using the following expression (1) to reduce an output error of a network.

$$dw/dt = -\partial E/\partial w \qquad (1)$$

where
w: weight,
E: output error of network, and
t: time

It has been pointed out that the back-propagation learning method takes a lot of time in learning. This method has a large dependency on parameters, so the learning time sometimes takes ten to tens of thousands times longer than that when optimum parameters are used.

As a means for solving such a problem, a non-linear optimization method has been used for learning. One of such methods prevailing in documents and the like may be a conjugate gradient method which requires less calculation because it uses only first-order differentiation, and which provides high speed learning.

Prior to describing the conjugate gradient method, there will be first described with reference to FIG. 1 the procedure of back-propagation on which the conjugate gradient method relies.

First, learning data 10 shown in FIG. 1 will be described. The learning data 10 is composed of input signals and desired output signals such as shown in FIGS. 2A and 2B. The number of input signals is (the number of input layer neurons) multiplied by (the number of learning patterns), and the number of desired output signals is (the number of output layer neurons) multiplied by (the number of learning patterns). Each input signal pattern is related to each corresponding desired output signal pattern. An input signal pattern 1 for example is inputted to the input layer, and an error of an output pattern at the output layer relative to a desired output signal pattern is calculated and used for learning.

At step 35, the pattern of input signals of the learning data 10 is inputted to input layer neurons.

At step 36, the input signals are sequentially propagated to output neurons, and a final output value of output layer neurons is obtained by using the following expression (2):

$$O^k_{pm} = f(net^k_{pm}) = \frac{1}{1 + e^{-netpmk}} \qquad (2)$$

$$net^k_{pm} = \sum_{j=1}^{n_k-1} W^k_{mj} \cdot O^{k-1}_{pj}$$

where
$O_{pm}^k$: output value of m-th neuron at k-th layer with input pattern P,
$net_{pm}^k$: net input value to m-th neuron at k-th layer with input pattern P,
$W_{mj}^k$: coupling weight between m-th neuron at k-th layer and j-th neuron at k−1-th neuron,
$n_k$: number of neurons at k-th layer,
$n_{k-1}$: number of neurons at k−1-th layer, and
f: sigmoid function.

As seen from the expression (2), a net input to each neuron is a sum of inner products between the weights of all synapses coupled to the neuron and the outputs to the synapses. In the following, a set of weights of all synapses coupled to each neuron is called a weight vector, and the magnitude of the weight vector is called a norm. The norm is defined by the following expression (3):

$$|W_i^k| = \sqrt{\sum_{j=1}^{n_k-1} (w_{ij}^k)^2} \qquad (3)$$

The expression (3) gives the norm of an i-th neuron at a k-th layer.

At step 37, there is calculated an output error Ep of the outputs at the output layer neurons calculated at the step 36, relative to the desired output signals of the learning data 10, by using the following expression (4):

$$E_p = \frac{1}{2} \sum_{j=1}^{n_l} (t_{pj} - O_{pj}^l)^2 \qquad (4)$$

where
l: number of layers of neural network,
$O_{pj}^l$: output value of j-th neuron at output layer (l-th layer) with input pattern P,
$t_{pj}$: desired output signal at j-th neuron at output layer (l-th layer) with input pattern P, and
$n_l$: number of neurons at output layer (l-th layer).

At step 38, for the input pattern P the steepest descent gradient (hereinafter simply called a gradient) relative to neuron weights is calculated using the following expression:

$$-\frac{\partial E_p}{\partial w_{mj}^k} = \delta_{pm}^k \cdot O_{pj}^{k-1} \qquad (5)$$

where $$\delta_{pm}^k = \begin{cases} \sum_{j=1}^{n_k} \delta_{pj}^{k+1} \cdot w_{jm}^k \cdot f'(\text{net}_{pm}^k) & (k \neq l) \\ (t_{pm} - O_{pm}^k) \cdot f'(\text{net}_{pm}^k) & (k = l) \end{cases}$$

$f'(\text{net}_{pm}^k)$ : differentiated sigmoid function.

At step 39, a new or present weight correction quantity $\Delta w_{mj}^k(i)$ is obtained from the calculated gradient and the previous correction quantity $\Delta w_{jm}^k(i-1)$, using the following expression (6):

$$\Delta w_{mj}^k(i) = -\eta \frac{\partial E_p}{\partial w_{mj}^k}(i) + \alpha \Delta w_{jm}^k(i-1) \qquad (6)$$

where
$\eta$: learning coefficient,
$\alpha$: moment coefficient, and
i: number of learning times.

The second term at the right side of the expression (6) is called a moment term which is empirically added to the expression (6) to speed up learning.

At step 40, the processes from steps 35 to 39 are repeated for all input patterns.

At step 41, the step 40 is repeated until the output error Ep becomes below a predetermined upper error limit being used as a standard for learning completion.

The principle of learning through back-propagation has been described above.

Next, the conjugate gradient method will be described. The conjugate gradient method is a hill climbing method in line searching under the condition that an error surface in a weight space can be locally approximated by a two-dimensional surface.

A conjugate direction will first be explained with reference to FIG. 3A showing ellipses each representing a contour line f(x)=xQx=d on an error surface of an objective function in the weight space expressed by a two-dimensional, second-order function. A cross point between an optional line I and a contour line f(x)=c₁ is indicated by a. Similarly, a cross point between a line L parallel with the line I and a contour line f(x)=c₂ is indicated by b. A minimum point m of the objective function is somewhere on a line J passing through the points a and b. This is attributed to the nature of ellipses representing contour lines on the error surface expressed by the second-order objective function. The lines I and J are said that they are in the conjugate direction. It has been proved that a minimum point of an n-dimensional, second-order function can be located when line search is performed n times from the initial point in the conjugate direction.

The conjugate gradient method is a method of searching a minimum point of the objective function while generating a conjugate vector (direction) using a gradient direction of the objective function. From the previous conjugate direction $d|(i-1)$ obtained in line searching and the gradient direction $-f_x(x(i))$ of the objective function, the next conjugate vector (direction) $d|(i)$ for line searching is obtained by using the following expressions (7) and (8):

$$d|(i) = -f_x(x(i)) + \beta(i) \cdot d|(i-1) \qquad (7)$$

$$\beta(i) = -\frac{\|-f_x(x(i))\|^2}{\|-f_x(x(i-1))\|^2} \qquad (8)$$

where $$\|f_x(x(i))\|^2 = f_{x1}(x(i))^2 + f_{x2}(x(i))^2 + \ldots$$
$$= \sum_{j=1}^{n} f_{xj}(x(i))$$
$$= \sum_{j=1}^{n} \frac{\partial f(x(i))}{\partial x_j}$$

Search starts first in the steepest descent direction from a search start point which is an initial starting point in line search. This procedure is found discussed, for example, in "Theory and Computational Methods in Optimization", Hideaki Kanoh, pp.77 to 85, 1987, Korona Publishing Co., Ltd.

The steepest descent direction (gradient) is a direction perpendicular to a tangent line to a contour line at a search start point in a weight space, such as shown in FIG. 4.

The above-described minimum point search method can be used not only for a second-order function, but also for other general functions. In the latter case, searching n times will no more ensure convergence to a minimum point, and so further search is required. However, if searches are performed more than n times, improper search direction occurs since the second-order function is assumed for the generation of the conjugate direction, resulting in poor convergence. It is therefore necessary to resume searches in the steepest descent direction after n calculations.

If such an approach is applied to learning for a neural network, e.g., a multi-layer (l-layer) type neural network, generation of the conjugate direction d is given by the following expressions (9) and (10):

$$d_{mj}^k(i) = -\frac{\partial E}{\partial w_{mj}^k}(i) + \beta(i) \cdot d_{mj}^k(i-1) \qquad (9)$$

$$\beta(i) = \frac{\|-\frac{\partial E}{\partial w/}(i)\|^2}{\|-\frac{\partial E}{\partial w/}(i-1)\|^2} \qquad (10)$$

where $$\left\| -\frac{\partial E}{\partial w/} \right\|^2 = \left( -\frac{\partial E}{\partial w^1_{11}} \right)^2 + \left( -\frac{\partial E}{\partial w^1_{12}} \right)^2 + \ldots +$$

$$\left( -\frac{\partial E}{\partial w^k_{mj}} \right)^2 + \ldots = \sum_{k=1}^{l} \sum_{m=1}^{n_k} \sum_{j=1}^{n_{k-1}} \left( -\frac{\partial E}{\partial w^k_{mj}} \right)^2$$

$d_{mj}^k$: coupling weight component in conjugate direction between m-th neuron at k-th layer and j-th neuron at k−1-th layer, $w_{mj}^k$: coupling weight between m-th neuron at k-th layer and j-th neuron at k−1-th layer, $n_k$: number of neurons at k-the layer, and l: number of neuron layers.

The error E is a sum of errors Ep for all learning patterns P as given by the following expression (11), different from the case of the expression (4):

$$E = \sum_p E_p \tag{11}$$

The learning algorithm for a neural network using a conventional conjugate gradient method will be described with reference to FIG. 5.

At step 55 shown in FIG. 5, initial values are assigned to the synaptic weights using a random number in order to start learning.

At step 56, an error gradient at a search start point in a weight space (coordinate system) is obtained from the following expression (12):

$$-\frac{\partial E}{\partial w^k_{jm}} = \sum_p \left( -\frac{\partial E_p}{\partial w^k_{jm}} \right) \tag{12}$$

The details of the step 56 are shown in FIG. 6.

At step 70 in FIG. 6, an input signal pattern of the learning data 10 is inputted to input layer neurons.

At step 71, the input signal pattern is propagated toward neurons on the output layer side, to obtain final outputs of the output layer neurons, by using the expression (2).

At step 72, an output error Ep is calculated using the expression (4), by using the desired outputs of the learning data 10 and the outputs of the output layer neurons calculated by the expression (4).

At step 73, for the input learning pattern P, a gradient relative to the neuron weights is calculated using expression (5).

At step 74, for the respective input learning patterns P, the gradients of neuron weights calculated at the step 73 are summed.

At step 75, the processes at the steps 70 to 74 are repeated for all learning patterns. In this manner, there is obtained a sum of all gradients of neuron weights for all learning patterns.

At the step 56 described above, the gradient given by the expression (12) can be obtained.

At steps 57, 58 and 59, a ratio $\beta(i)$ of the previous line search conjugate vector (direction) to be added to the gradient at the search start point of the present line search is calculated to generate the conjugate vector (direction) of the present line search. If the number i of calculations for obtaining the conjugate vector (direction) satisfies i mod n=0, i.e., if a remainder of i divided by n (i, n:integer) is 0, then $\beta(i)$ is set to 0 at step 58. If i mod n is not 0, $\beta(i)$ is calculated at step 59 using the expression (10). At the step 58, $\beta(i)$ is reset to 0 every n-th time (n is the number of all weights in a network and takes an integer value) because the line search is required to resume in the steepest descent direction every n-th time in order to prevent convergence from worsening. n represents the number of weights in a weight space, and corresponds to the above-described n-dimension.

At step 60 from the gradient $$-\frac{\partial E}{\partial w/}(i)$$

and the previous conjugate vector (direction) d|(i−1), the next conjugate vector (direction) d|(i) is obtained using the expression (9)

Obtained at step 61 is a step position η(i) which is considered that it can minimize the error E in the conjugate direction upon execution of line searches in the conjugate direction at the search start point.

At step 62, weights w/ are renewed using the step position η(i) obtained at the step 61.

The steps 56 to 62 are repeated until the output error converges below a predetermined upper error limit being used as a standard for learning completion.

As shown in FIG. 4, in the above description, line search is first performed in the steepest descent direction at the search start point η0 to obtain the error minimum point η(0), basing upon the first learning (i=0). Then, basing upon the second learning, line search is performed in the conjugate direction d|i+1 by using the point η(0) as the search start point η0. In this case, the previous conjugate vector (direction) d|i is the steepest descent direction, or gradient. Thereafter, line searches in the conjugate direction is repeated to obtain a global minimum error point.

The principle of learning by a conventional conjugate gradient method has been described above.

The principles of the conjugate gradient method and back-propagation are compared with reference to FIGS. 4 and 7. FIG. 7 is a diagram illustrating a search for a minimum value of a two-dimensional, second-order function by using back-propagation. This method is not efficient because searches are performed in the steepest descent direction at predetermined step lengths $l_1, L_2, \ldots$ In contrast with this method, in the case of the conjugate gradient method shown in FIG. 4, once the conjugate direction is found, a minimum error is present on a line in the conjugate direction. Therefore, by properly setting step lengths and performing line searches, it is possible to efficiently search the minimum point.

SUMMARY OF THE INVENTION

One problem associated with learning by the conjugate gradient method is "protracted learning by an excessive increase of weights".

This problem will be detailed with reference to FIGS. 8 to 11. Consider first learning through one-dimensional input to a neuron. An output from a neuron is given by the following expressions (13) and (14):

$$f(net) = 1/(1 + \exp(-net)) \tag{13}$$

$$net = w \cdot o \tag{14}$$

FIG. 8 shows a weight (w) dependency of a sigmoid function f, and FIG. 9 shows a weight (w) dependency of a differentiated sigmoid function df/dnet. As shown in FIG. 8, the sigmoid function rises more steeply as the weight becomes large. On the positive and negative sides of an input signal 0, the value of the sigmoid function rapidly comes near 1 or 0. In this case, as shown in FIG. 9, the value of the differentiated sigmoid function rapidly comes near 0 as the input value goes apart from x=0. As described at the step 56 shown in FIG. 5, each gradient to be obtained for final renewal of weights is expressed by a differentiated sigmoid function in the form of multiplication. Therefore, if the weight becomes large, the gradient becomes small and so learning is protracted.

This principle will be further detailed with reference to FIGS. 10 and 11. This example illustrates learning of linear decision of signals a and b, with two-dimensional inputs to a neuron. FIG. 11 shows the state of learning completion. In this example, learning is performed such that each neuron outputs 0.9 when signal a is inputted, and outputs 0.1 when signal b is inputted. An output $O_3$ of a neuron is given by the following expressions (15) and (16):

$$O_3 = f(\text{net}) = 1/(1+\exp(-\text{net})) \quad (15)$$

$$\text{net} = w_1 \cdot o_1 + w_2 \cdot o_2 + \theta \quad (16)$$

FIG. 10 shows a state before learning. U represents a line for net=0, and is called hereinafter a hyperplane or linear decision boundary (surface). In this initial state, each neuron outputs 0.6 when signal a is inputted, and outputs 0.4 when signal b is inputted. The more the value net goes apart from net=0, the more the value of the sigmoid function comes near 0 or 1. In order to obtain the state shown in FIG. 11 through learning, it is necessary to rotate the line U to make it apart from a and b as much as possible and at the same time to make the norm of the weight vector large to make the sigmoid function steep. With such setting, an output can be made near 0.9 for input a and near 0.1 for input b. However, if the norm becomes large before the line U is rotated to a sufficient extent, the differentiated value df/dnet included in the gradient expression in the form of multiplication becomes small, and so the gradient becomes small. As a result, the amount of renewing weights reduces, and learning is almost protracted.

The conjugate gradient method operates to reduce an error by line searches at the step 51 shown in FIG. 5. As a means for reducing an error, there are two methods as described above, including making the sigmoid function steep, and rotating the hyperplane. The conjugate gradient method often uses only the former method in order to reduce an error. The former method is a method of reducing an error by making the norm of the weight vector large, resulting in a small df/dnet as explained with FIG. 9. As a result, the gradient including df/dnet in the form of multiplication becomes small, thereby learning is protracted.

The above problem occurs not only for the conjugate gradient method but also for the case where all searches are performed in the steepest descent direction, or a Quasi-Newton method is used in line searches.

It is an object of the present invention to provide a learning method and apparatus for neural networks eliminating the above-described prior art disadvantages.

It is another object of the present invention to provide a learning method and apparatus for neural networks and a simulator using or simulating a neural network, capable of preventing protracted learning and allowing high speed learning.

It is a still further object of the present invention to provide a learning method and apparatus for neural networks, which uses the conjugate gradient method and is capable of preventing protracted learning to be caused by an imbalance between hyperplane rotation and steep sigmoid function, and allowing high speed learning.

According to an aspect of the present invention, a learning method for a neural network includes a step of providing an upper limit of a quantity of a weight change before and after weight renewals during one learning, and a step of determining a weight renewal quantity or changes in weights used at the one learning, the weight renewal quantity being determined so as not to exceed the upper limit.

According to another aspect of the present invention, a learning method for a neural network using an optimization method with line searches includes a step of providing an upper limit of a difference between weights at a search start point and a present search point, for line searches, a step of setting a line search direction basing upon learning data and the weights at the search start point, a step of obtaining the present search point having a minimum error determined by the learning data and the weights at the present search point, during line searches, the present search point being determined under the condition that the difference does not exceed the upper limit, a step of determining changes in weights corresponding to the obtained present search point, and a step of using as the next line search start point a sum of the weights at the present search point and the determined changes in weights.

According to still another aspect of the present invention, a learning method for a neural network using an optimization method with line searches includes: a step of providing initial values of weight for the neural network: a step of providing an upper limit of a difference between neuron weight norm layer averages at a search start point corresponding to the initial value and a present search point, for line searches, a step of setting a line search direction based upon learning data and the weights at the search start point: a step of obtaining the present search point having a minimum error determined by the learning data and the weights at the present search point, during line searches, the present search point being searched on a line in the set line search direction and determined under the condition that the difference does not exceed the upper limit: a step of determining charges in weights corresponding to the obtained present search point, and a step of using as the next line search start point a sum of the weights at the present search start point and the determined weight renewal quantity.

According to still another aspect of the present invention, a simulator using a neural network includes a learning apparatus, a unit for storing learning results obtained at the end of learning by the learning apparatus, and a unit for supplying input data to the neural network, wherein the neural network performs simulations using the input data and the learning results stored in the storing means, and outputs simulation results.

According to the present invention, in learning of neural networks such as recurrent neural networks and multi-layer neural networks, there is provided a predetermined (constant or variable) upper limit of an increase of weights at a present start point from weights at a search start point in a weight space. Line searches are executed under the condition that the increase of weights does not exceed the upper limit.

In one method of providing an upper limit of weight increase, absolute values of weight vectors of neurons at each layer are calculated and averaged to obtain absolute values average for each layer. An upper limit of the average value is provided.

In this case, during line searches different weights are used to check error values. A weight norm layer average is calculated for each layer, and an error minimum point is searched under the condition that an increase of weights before and after search does not exceed a predetermined upper limit.

In another method of providing an upper limit of weight increase, a weight norm layer average of all layers may also be used.

With the above-described learning method and apparatus, an increase of weights during line searches is controlled below a predetermined upper limit. Therefore, weights will not increase abruptly and an error can be reduced while solving a tradeoff between rotation of a hyperplane and rapid rise of a sigmoid function. It is therefore possible to provide high speed learning with least protracted learning.

A line search method may be used in both a steepest descent method, a conjugate gradient method, or a Quasi-Newton method.

A simulator using a learning method of the present invention provides high speed learning without protracted learning, allowing correct and rapid simulations.

BRIEF DESCRIPTION OF THE DRAWINGS

FIG. 15 is a diagram showing a weight space for explaining line searches according to the one embodiment;

FIGS. 16A and 16B are diagrams showing another example of line searches according to the one embodiment;

FIG. 22 is a diagram showing learning data according to the one embodiment;

FIGS. 23A and 23B are diagrams showing bench mark test results of a 16 bit encoder to which the learning method according to the present invention and the learning method through back-propagation are applied;

FIGS. 24A and 24B are diagrams showing bench mark test results of character recognition to which the learning method according to the present invention and the learning method through back-propagation are applied;

DESCRIPTION OF THE PREFERRED EMBODIMENTS

Embodiments of the learning method and apparatus for neural networks according to the present invention will be described with reference to the accompanying drawings.

Figure 12:
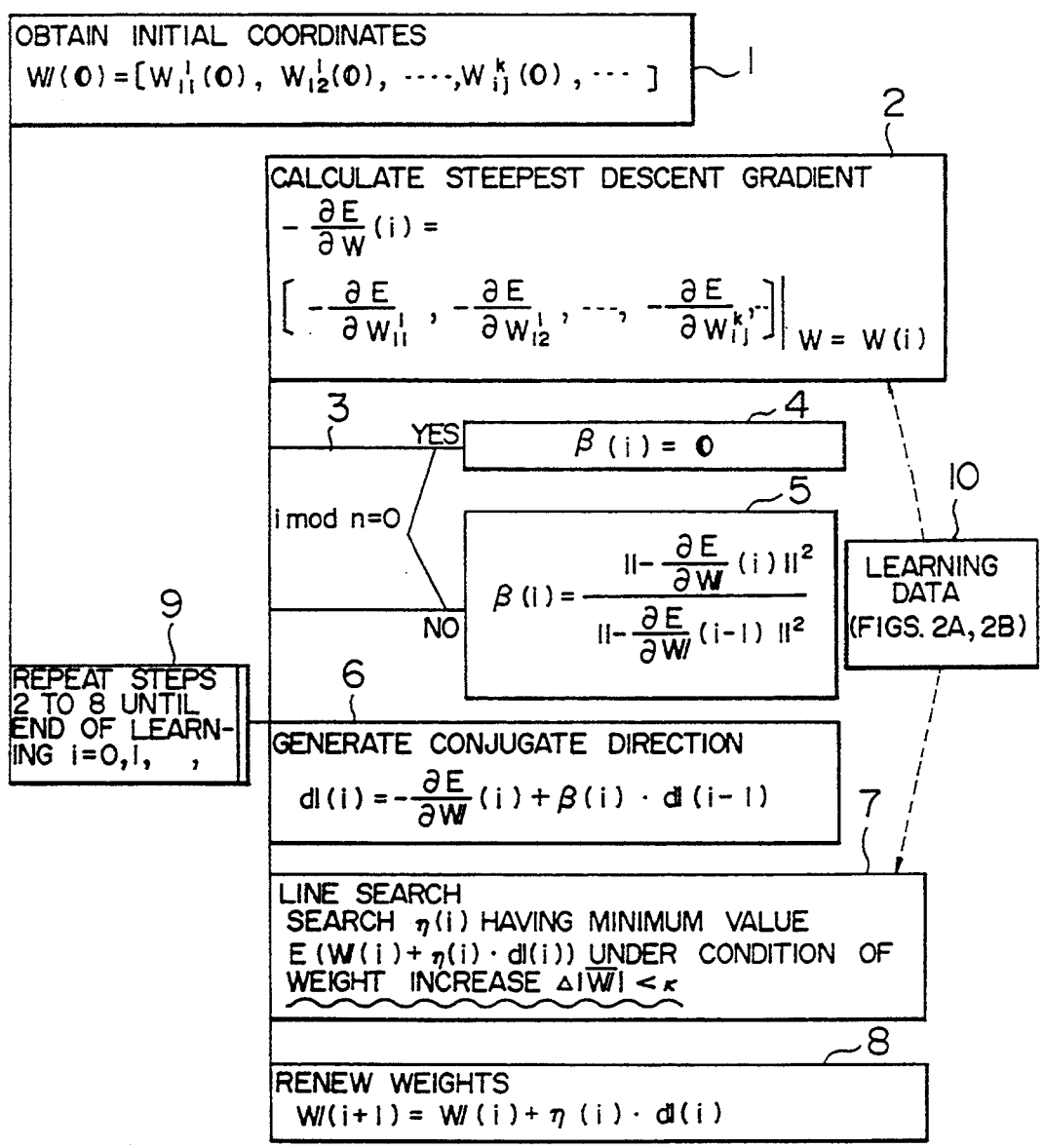
FIG. 12 is a PAD showing the procedure to be executed by one embodiment of the learning method and apparatus for neural networks according to the present invention.

FIG. 12 is a PAD showing the overall procedure to be executed by an embodiment of the present invention applied to the conjugate gradient method, the feature of the present invention being indicated by a waved underline in FIG. 12.

Figure 13:
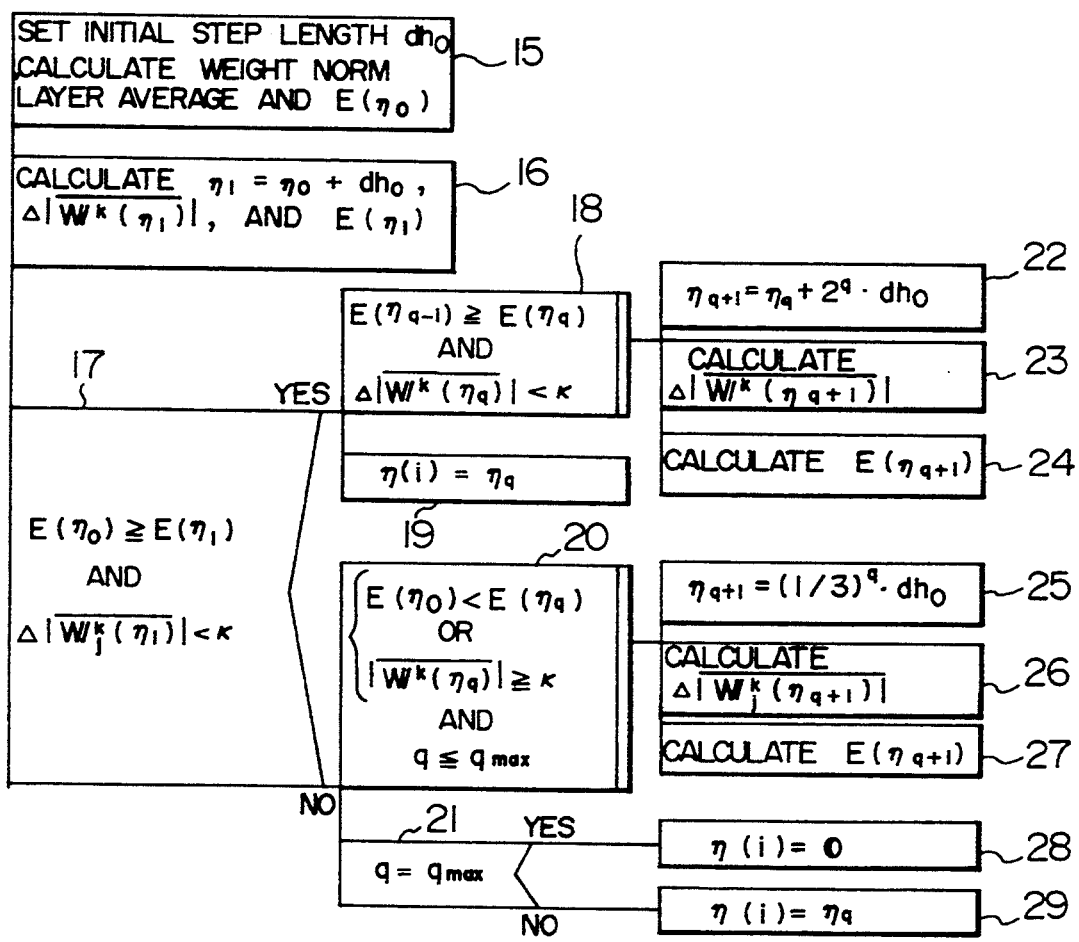
FIG. 13 is a PAD showing the procedure to be executed by line searches of the procedure shown in FIG. 12, when an upper limit is provided for an increase in weights.

FIG. 13 is a detailed PAD showing the procedure to be executed by line searches, when an upper limit is provided for an increase in weights, this diagram showing the feature of the present invention.

Figure 14A:
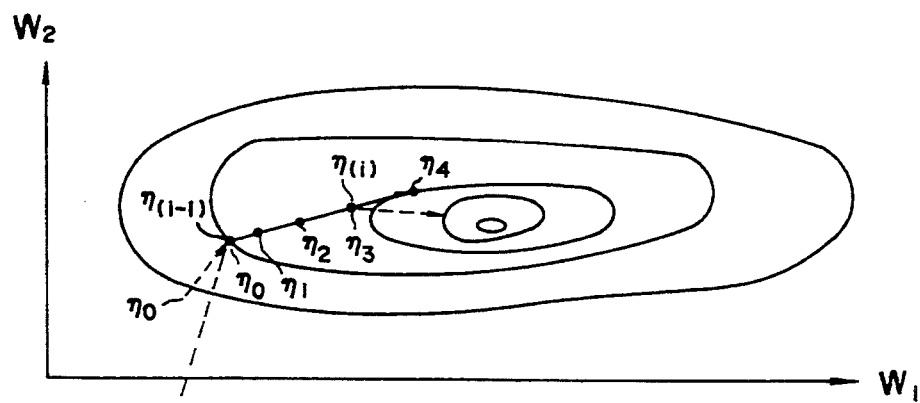
FIGS. 14A and 14B are diagrams showing an example for explaining line searches of the procedure shown in FIG. 12, when an upper limit is provided for an increase in weights.
Figure 14B:
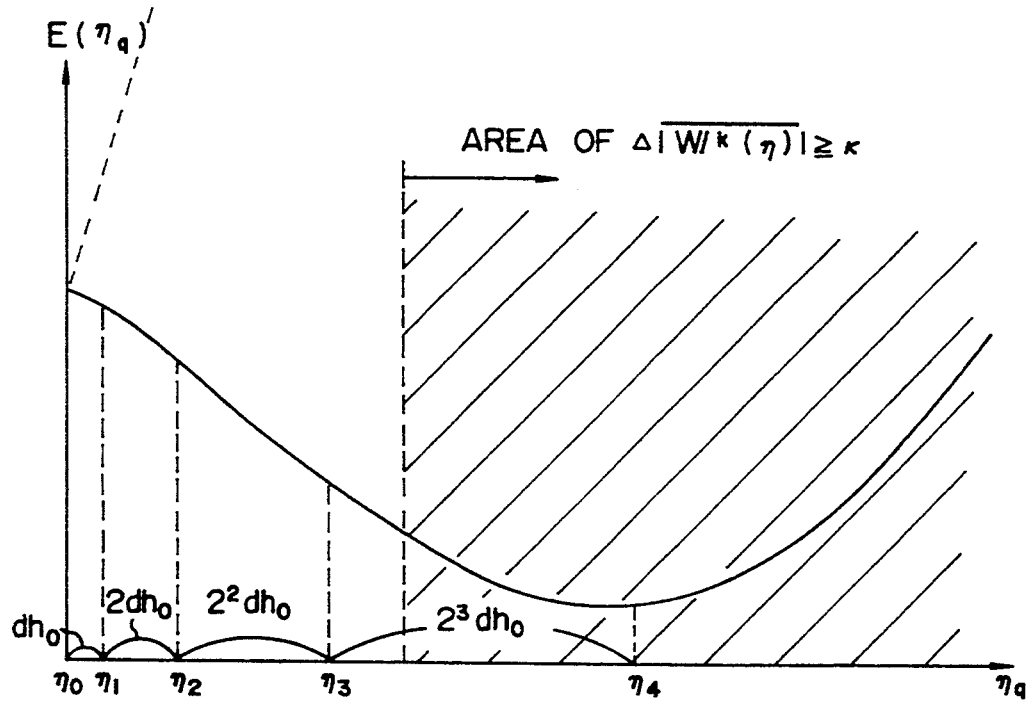

FIGS. 14A and 14B are diagrams showing a limit of line searches provided for an increase in weights.

FIG. 15 is a diagram showing a weight space for explaining line searches according to the embodiment.

Figure 1:
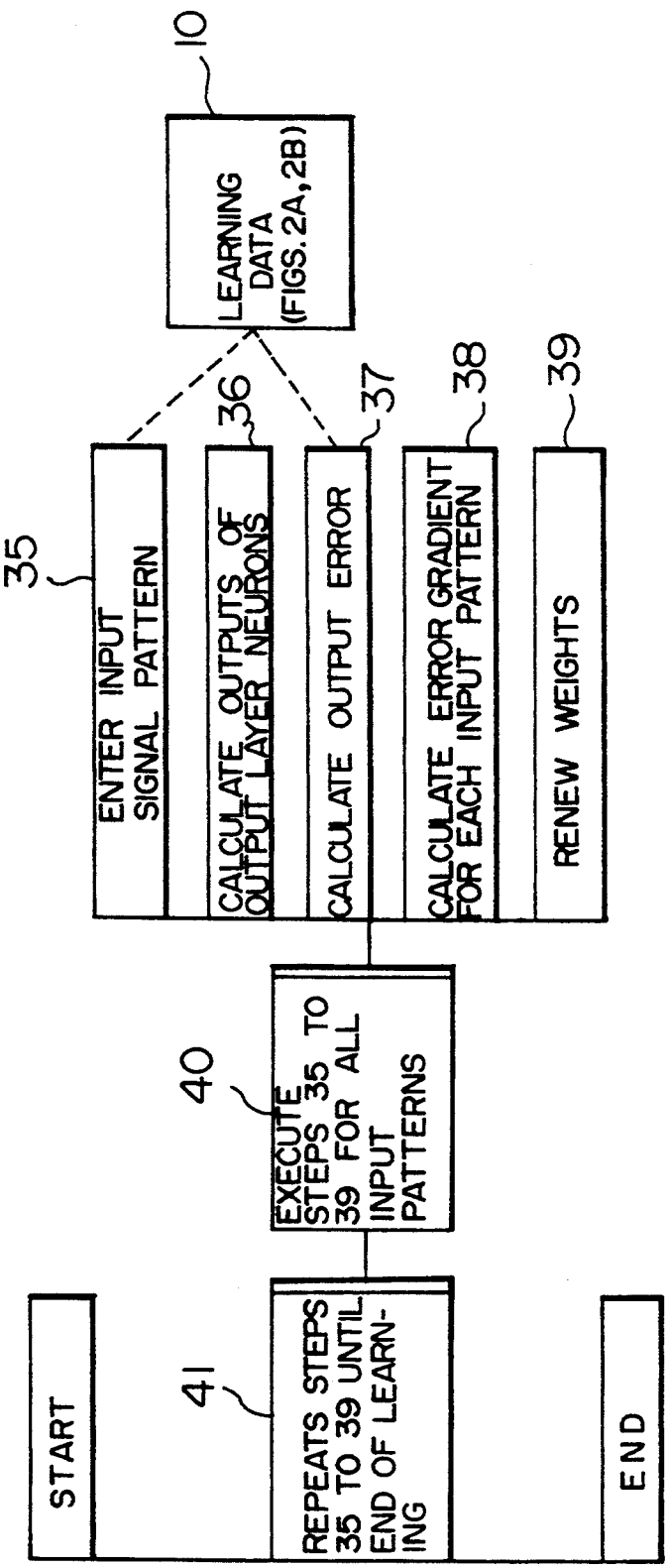
FIG. 1 is a diagram showing the detailed procedure of back-propagation.
Figure 2A:
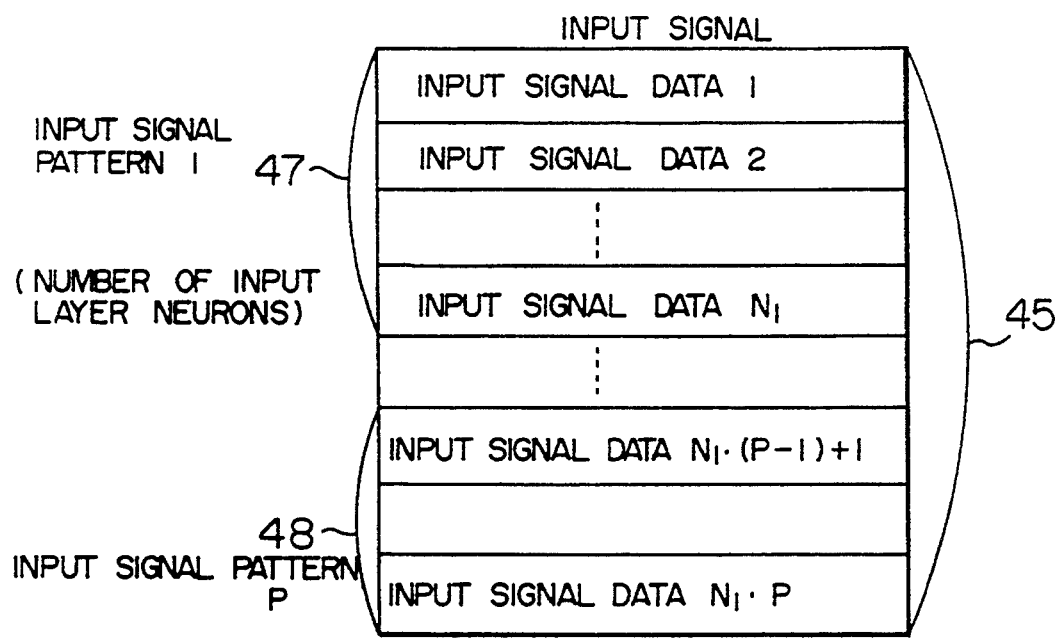
FIG. 2A is a diagram showing an example of input signals of learning data.
Figure 2B:
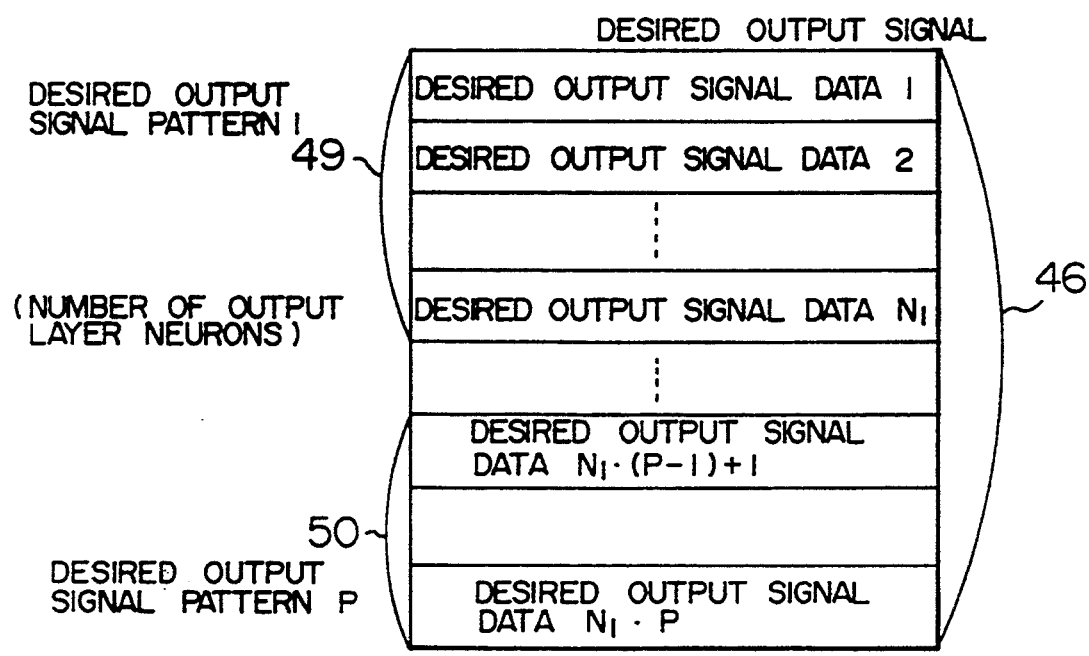
FIG. 2B is a diagram showing an example of desired output signals of learning data.
Figure 3A:
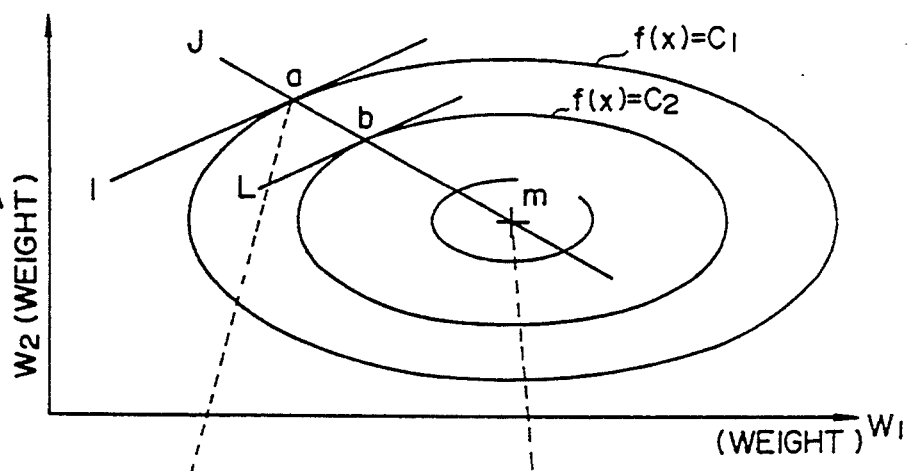
FIG. 3A is a diagram showing an error surface for explaining a conjugate direction of the conjugate gradient method.
Figure 3B:
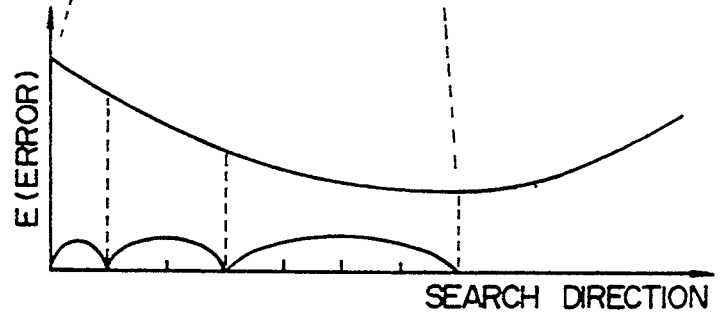
FIG. 3B is a cross section along a line on the error surface of FIG. 3A for explaining line search.
Figure 4:
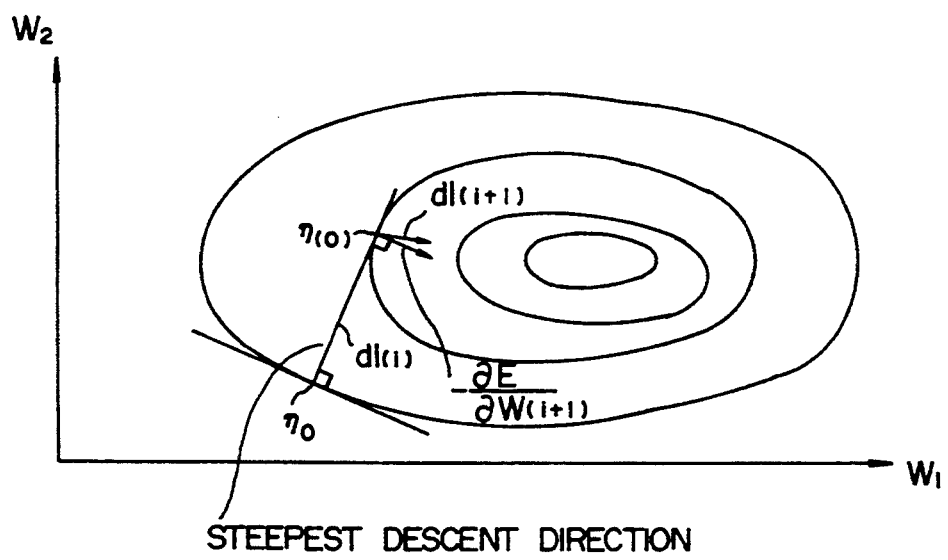
FIG. 4 is a diagram showing a weight space for explaining a conventional conjugate gradient diagram.
Figure 5:
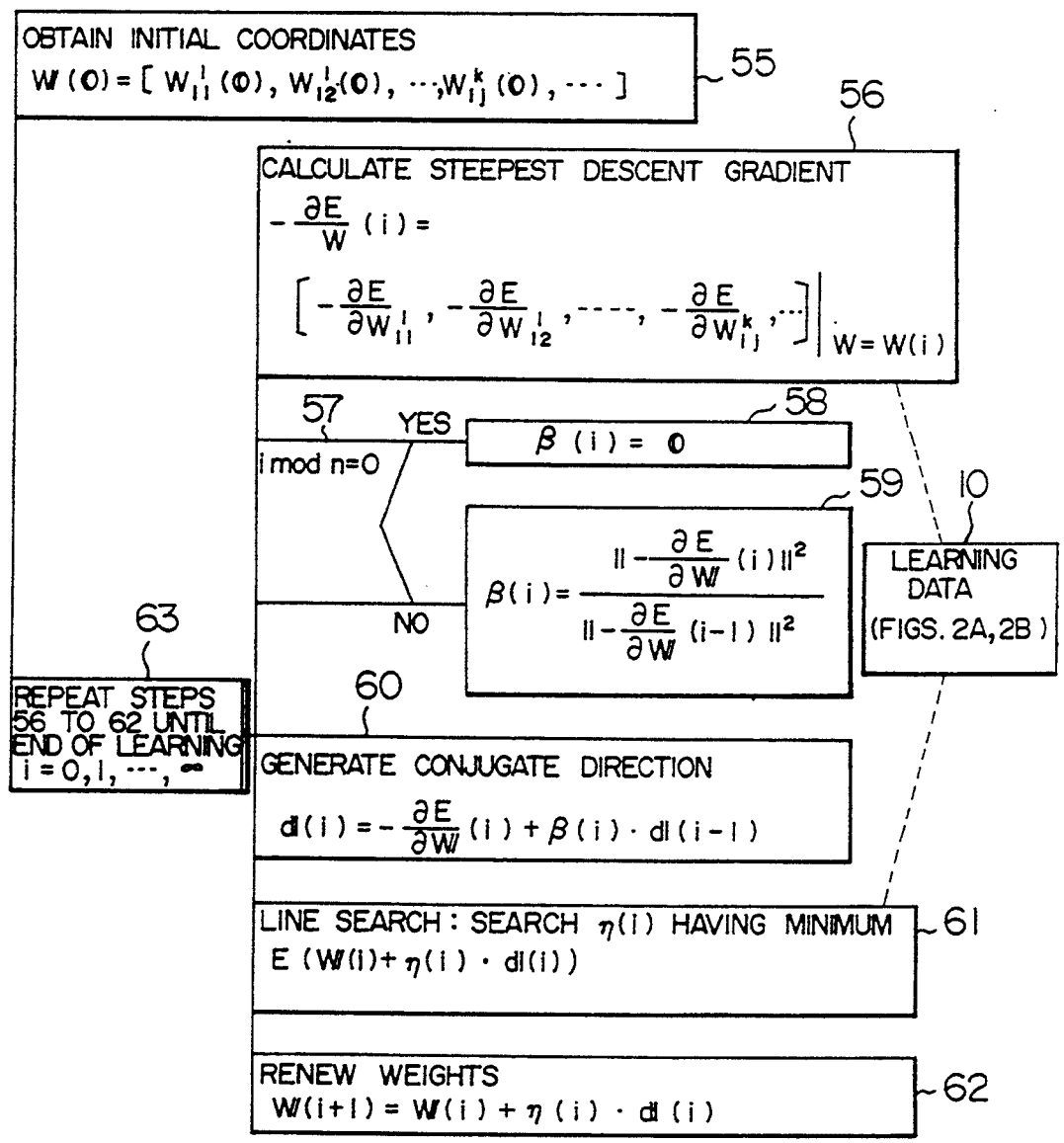
FIG. 5 is a problem analysis diagram (PAD) showing the procedure to be executed by a conventional conjugate gradient method.

FIGS. 2A and 2B are diagrams showing the details of learning data 10 to be used for learning weights. In FIG. 2A, reference numeral 45 represents signals to be inputted to input layer neurons, and the number of input signals is (the number of input layer neurons) multiplied by (the number of learning patterns). In FIG. 2B, reference numeral 46 represents desired output signals to be used for obtaining errors of outputs at the output layer neurons, and the number of desired output signals is (the number of output layer neurons) multiplied by (the number of learning patterns). The input signals 45 and desired output signals are paired, e.g., input patterns 1 (47) and (48) are paired with desired output patterns 1 (49) and (50), respectively.

Next, the procedure of the embodiment will be described with reference to FIG. 12. In FIG. 12, step 7 shows the characteristic feature of the present invention.

At step 1, initial values of weights, i.e., the search start point (point $\eta_0$ in FIG. 15) is first given using a random number, for example, in order to start learning.

At step 2, the steepest descent gradient of errors (hereinafter simply called gradient) in a weight space (coordinate system) is obtained by the expression (12). The details of the step 2 are shown in FIG. 6.

Figure 6:
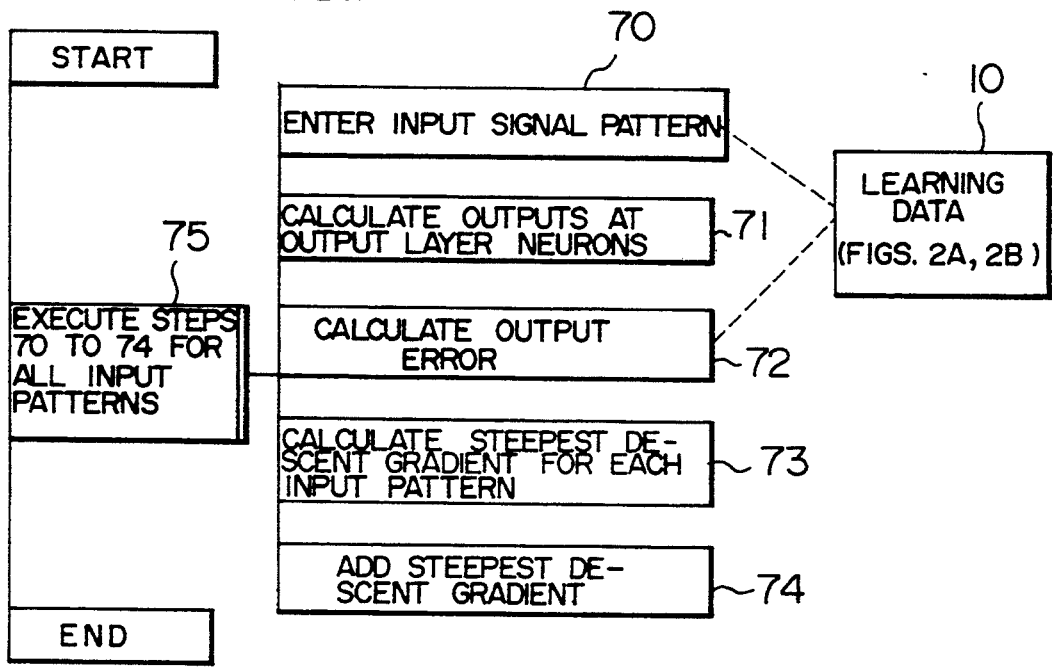
FIG. 6 is a PAD showing the detailed procedure of calculating a steepest descent gradient.
Figure 7:
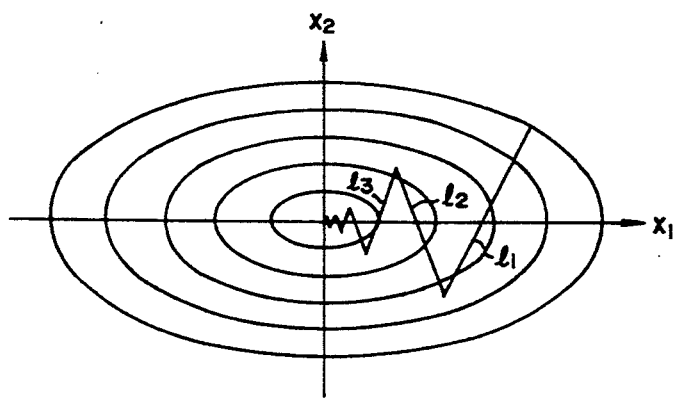
FIG. 7 is a diagram for explaining a search method through back-propagation.
Figure 8:
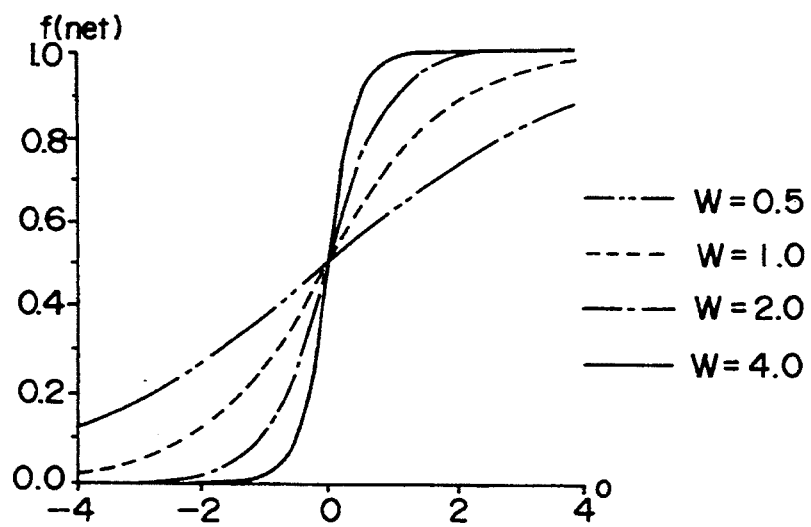
FIG. 8 is a diagram showing a weight dependency of a sigmoid function.
Figure 9:
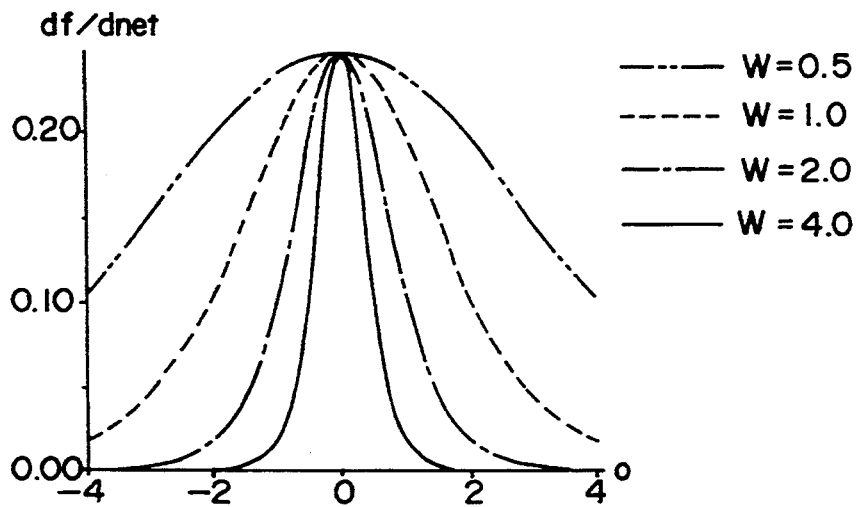
FIG. 9 is a diagram showing a weight dependency of a differentiated sigmoid function.
Figure 10:
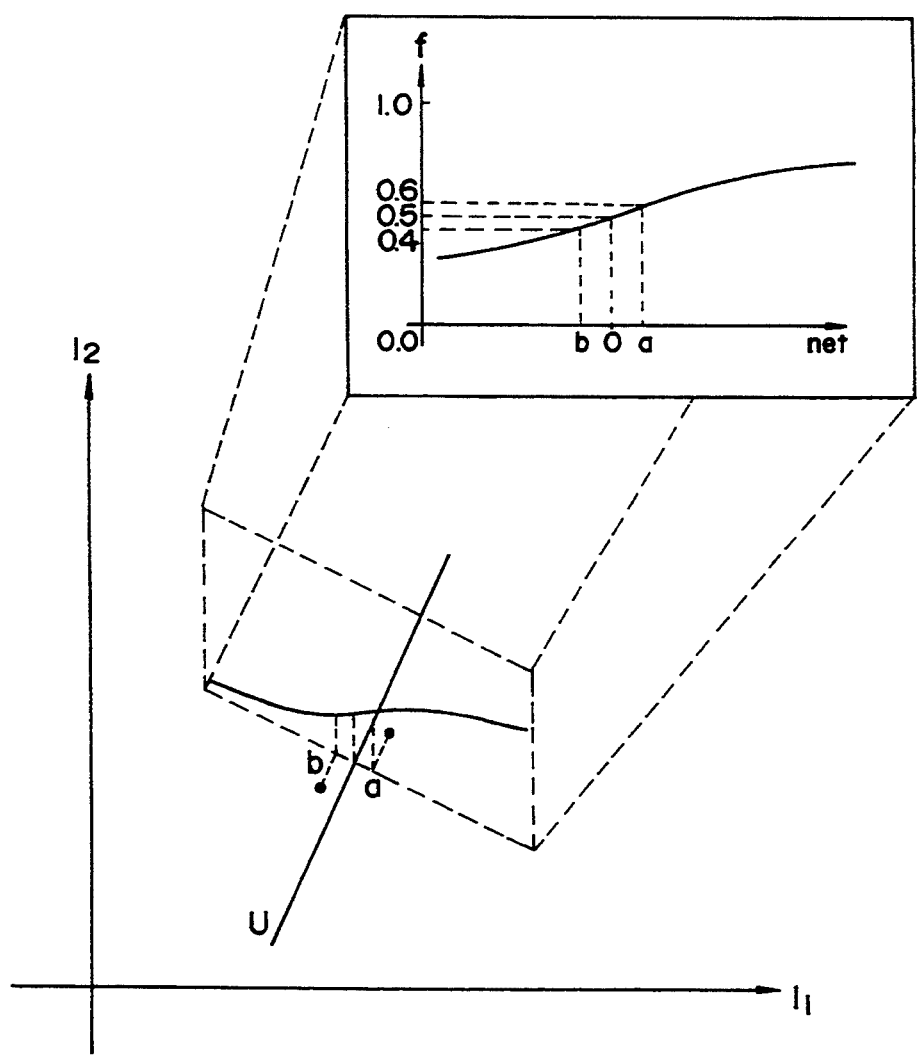
FIG. 10 is a diagram showing a state before learning linear decision of signals a and b by neurons.
Figure 11:
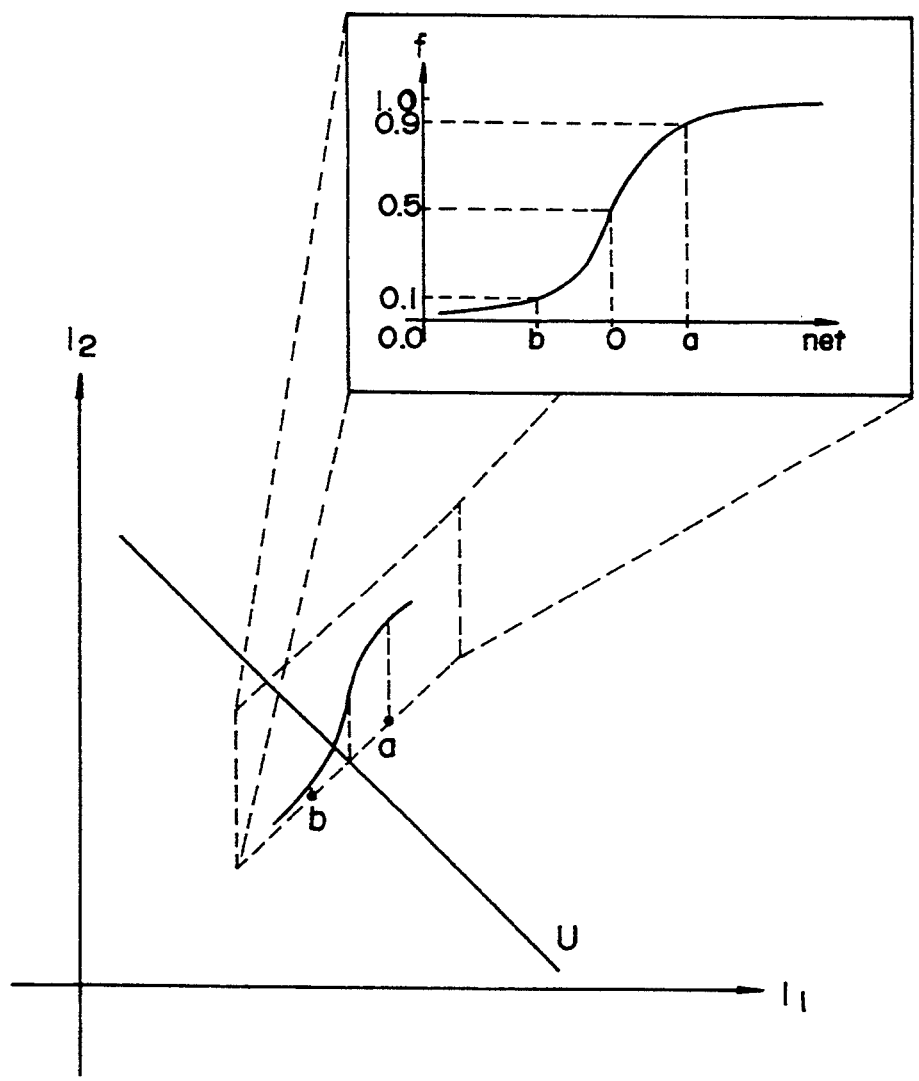
FIG. 11 is a diagram showing a state after learning linear decision of signals a and b by neurons.

At step 70 in FIG. 6, an input signal pattern of the learning data 10 is inputted to input layer neurons.

At step 71, the input signal pattern is propagated toward neurons on the output layer side, to obtain final outputs of the output layer neurons, by using the expression (2).

At step 72, an output error Ep is calculated using the expression (4), by using the desired outputs of the learning data 10 and the outputs of the output layer neurons calculated by the expression (4).

At step 73, for the input learning pattern P the gradient relative to neuron weights is calculated using the expression (5).

At step 74, for respective input learning patterns P the gradients of neuron weights calculated at the step 73 are summed.

At step 75, the processes at the steps 70 to 74 are repeated for all learning patterns. In this manner, a sum of all gradients of neuron weights for all learning patterns is obtained.

At the step 2 described above, the gradient (vector) given by the expression (12) can be obtained, the gradient vector being a gradient at the start point of the present line search.

At steps 3, 4 and 5, a ratio $\beta(i)$ of the previous line search conjugate vector (direction) to be added to the gradient at the search start point of the present line search is calculated to generate the conjugate vector (direction) of the present line search. If i mod n=0, then $\beta(i)$ is set to 0 at step 4. If i mod n is not 0, $\beta(i)$ is calculated at step 5 using the expression (10). At the step 4, $\beta(i)$ is reset to 0 every n-th time (n is the number of all weights in a network) because the line search is required to resume in the steepest descent direction every n-th time in order to prevent convergence from worsening.

At step 6, the present conjugate vector (direction) d|(i) is calculated from the expression (9), by using the gradient $$-\frac{\partial E}{\partial w/}(i)$$

and previous conjugate vector (direction) d(i).

As shown in FIG. 15, in the above description, during the first learning (i=0), $\beta(i)$ is reset to 0. Therefore, the conjugate direction d|(i) at the line search start point $\eta_0$ is the steepest descent direction $$-\frac{\partial E}{\partial w/}(i).$$

The next line search start point is an error minimum point $\eta_{(0)}$ present in this steepest descent direction starting from the point $\eta_0$. This error minimum point is searched while satisfying the condition to be later described at step 7. In FIG. 15, the position of the point $\eta_{(0)}$ is shown limited by such a condition. For line searches at the second learning (i=1), the conjugate vector (direction),is given by $$d/(1) = -\frac{\partial E}{\partial W/} + \beta(1) * d/(0).$$

$\eta_{(i)}$ represents a minimum error point obtained at the (i+1)-th learning, and $\eta_q$ represents the q-th line search.

Each line search from the search start point $\eta_0$ will be described.

At step 7, a minimum error point $\eta_{(i)}$ present on a line in the conjugate direction is obtained through line searches in the conjugate direction indicated by the conjugate vector. This minimum error point is obtained under the condition that an increase of a weight norm layer average from that at the line search start point does not exceed a predetermined threshold value $\kappa$, for each of all layers. The term "weight norm layer average" herein used means an average of all absolute weight vectors associated with one particular layer.

The details of the step 7 is shown in FIG. 13. The details of the step 7 will be described with reference to FIGS. 14A and 14B.

At step 15, an initial step length $dh_0$ from the search start point $\eta_0$ is set for line searches, a weight norm layer average at the point $\eta_0$ at each layer given by the following expression (17) is calculated, and an error $E(\eta_0)$ at the search start point $\eta_0$ is calculated. The error $E(\eta)$ is defined by the following expression (18).

$$|W/^k| = \sum_{j=1}^{n_k} |W/_j^k|/n_k \quad (17)$$

where $$|\overline{W/_j^k}| = \sqrt{\sum_{j=1}^{n_k-1} (w_{ij}^k)^2}$$

$w_{ij}^k$: coupling weight between i-th neuron at k-th layer and j-th neuron at k−1-th layer, and $n_k$: number of neurons at k-th layer.

The k−1-th layer is a layer one layer before the k-th layer on the input layer side.

$$E(\eta) = E(w/(\eta))$$

$$W/(\eta) = w/ + \eta d| \quad (18)$$

w/and d| represent all weights and all conjugate vectors (directions). Therefore, the weight norm layer average is an average of all norms of weights for neurons at each layer.

At step 16, new weights are generated at the step position $\eta_1$ spaced apart from the search start point by the initial step length $dh_0$. The weight norm layer average is then calculated for each layer. A difference between the weight norm layer average at the start point and the calculated weight norm layer average is obtained for each layer. This difference is defined by the following expression (19):

$$\Delta|\overline{W/^k}(\eta)| = |\overline{W/^k + \eta d/^k}| - |\overline{W/^k}| \quad (19)$$

The error $E(\eta_1)$ is calculated for the newly generated weights.

At step 17, it is judged whether the difference between weight norm layer averages at the start point $\eta_0$ and new point $\eta_1$ is smaller than an upper limit $\kappa$ for each layer and whether the error at the point is equal to, or smaller than, the error at the start point $\eta_0$. If these conditions are satisfied, i.e., if YES as shown in FIG. 13, the control advances to step 18, If NO, the control advances to step 20.

At steps 18 to 24, a new step position $\eta$ is obtained by using a longer step length to obtain a minimum error, under the conditions (1) and (2). The condition (1){$\Delta|\overline{W/^k}(\eta_q)|\kappa$} is that the difference between weight norm layer averages at the search start point and the present search point is smaller than the upper limit for each layer. The condition (2) {$E(\eta_{q-1}\geq E(\eta_q)$} is that the error at the previous search point is equal to, or larger than, that at the present search point. The details of this will be described below.

At step 22, the step length is changed to a longer step length, e.g., two times longer than the initial step length. The new step length is added to obtain a new step position $\eta_{q+1}$.

At step 23, a difference between weight norm layer averages at the position $\eta_q$ and the start point is calculated using new weights at the position $\eta_{q+1}$.

At step 24, an error $E(\eta_{q+1})$ for the new weights is calculated.

At the step 18, it is judged whether the difference between weight norm layer averages is smaller than $\kappa$ and the error is equal to, or smaller than, the previous error. If the conditions are satisfied, the steps 22 to 24 are repeated.

Line searches in the conjugate direction are repeated at the step lengths $dh_0$, $3dh_0$, $7dh_0$, ...

The above operation will further be described with reference to FIGS. 14A and 14B. FIGS. 14A and 14B show errors $E(\eta_q)$ at step positions $\eta_1$, $\eta_2$, $\eta_3$ and $\eta_4$ corresponding to the step lengths $dh_0$, $3dh_0$, $7dh_0$, and $15dh_0$. As seen from FIGS. 14A and 14B, the error at the position $\eta_4$ is smaller than the error at the position $\eta_3$. However, in this example shown in FIGS. 14A and 14B, the position $\eta_4$ is within an area (hatched area) where one of layers causes a difference between weight norm layer averages equal to, or larger than, the upper limit K. Therefore, the position $\eta_3$ is considered as a minimum error point, and line searches are terminated.

At step 19, the position $\eta_q$ ($\eta_3$ in the example shown in FIGS. 14A and 14B) considered as the minimum error point is used as $\eta(i)$ for weight correction.

Next, the (i+1)-th learning is performed at the step 2 to start line searches in a new conjugate direction.

Figure 17A:
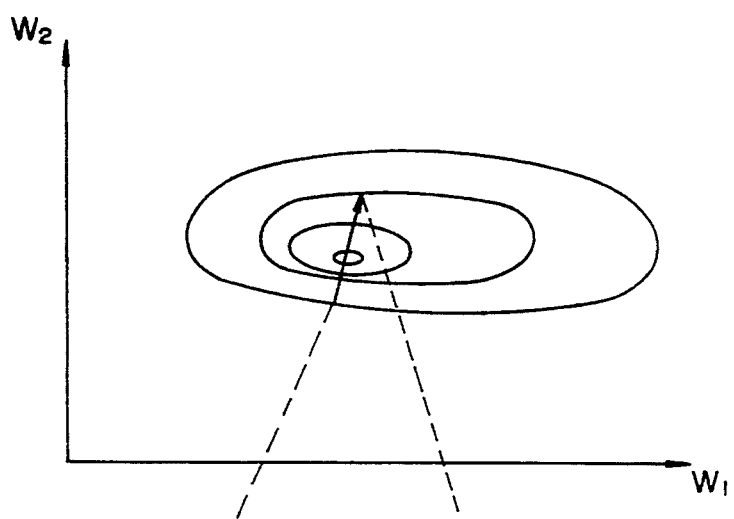
FIGS. 17A and 17B are diagrams showing a further example of line searches according to the one embodiment.
Figure 17B:
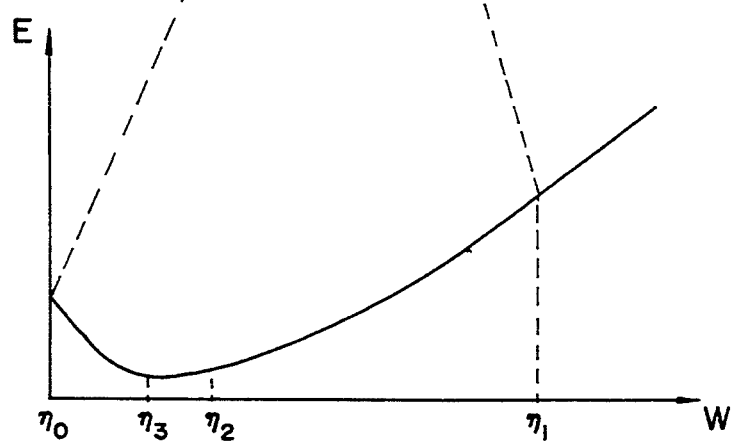

If it is judged at the step 17 that a difference between weight norm layer averages at the position $\eta_1$ is equal to, or larger than, the upper limit K or the error $E(\eta_1)$ at the position $\eta_1$ is larger than the error $E(\eta_0)$ at the search start point $\eta_0$, then steps 20 to 29 are executed. Examples of line searches in this case are shown in FIGS. 16A and 16B and FIGS. 17A and 17B. FIGS. 16A and 16B show an increase of errors $E(\eta)$ in the direction from the search start point $\eta_0$ to point $\eta_1$, and FIGS. 17A and 17B show errors $E(\eta)$ passing a local minimum point.

At steps 20 to 27, a new step position $\eta$ is obtained by using a shorter step length than $dh_0$ to obtain a minimum error on a line in the line search direction, under the conditions (1) in which the difference between weight norm layer averages at the search start point $\eta_0$ and the present search point is equal to, or smaller than, the upper limit $\kappa$ for each layer. The details of this will be described below.

At step 25, the step length from $\eta_0$ is changed to a shorter step length, e.g., $(\frac{1}{3})^{q*} dh_0$, to obtain a new step length $\eta_{q+1}$. Namely, the position $\eta_2$ becomes $dh_0/3$, with the step length from $\eta_0$ being set to $dh_0/3$.

At step 26, a difference between weight norm layer averages at the position $\eta_q$ and the start point is calculated using new weights at the position $\eta_{q+1}$.

At step 27, an error $E(\eta_{q+1})$ for the new weights is calculated.

At the step 20, it is judged whether the difference between the weight norm layer averages is equal to, or smaller than the upper limit $\kappa$, or the error is smaller than the previous error, i.e., whether the conditions (1) or (2) is not satisfied. If not satisfied, the steps 25 to 27 are repeated within the range of $q \leq q_{max}$ (q, $q_{max}$:integer). A limitation $q \leq q_{max}$ is intended to prevent line searches with an infinitely short step, because a minimum error point will not be found in a wrong line search direction.

At step 21, if $q = q_{max}$, it is assumed that a wrong line search direction was used, and the point $\eta$ used for weight correction is set to 0 to resume line searches again in the steepest descent direction.

Specifically, as shown in FIGS. 16A and 16B, a minimum error point cannot be found because the error is larger than that at the search start point $(E(\eta_0) < E(\eta_q))$ even if the step length is made shorter and shorter. In such a case, the point is set to $\eta(i) = 0$ to resume line searches again in the steepest descent direction.

On the other hand, in the case shown in FIGS. 17A and 17B, $\eta_3$ is obtained as the minimum error point (local minimum error point) of line searches.

Upon execution of the step 7 detailed above, a minimum error point $\eta$ can be obtained under the condition that an increase of a weight norm layer average from that at the search start point is equal to, or smaller than the upper limit $\kappa$, i.e., under the condition (1).

At step 8, weights are renewed by using $\eta(i)$ obtained at the step 21, wherein $\eta(i)\cdot d|(i)$ represents weight renewal quantity or changes in weights.

At step 9, the steps 2 to 8 are repeated until output errors become below a predetermined error upper limit used as a standard for learning completion, and the position with a global minimum error in the weight space can be obtained as the results of learning.

As described above, each time a new learning is performed, i.e., each time steps 2 to 8 are executed, i is incremented by 1. Each time it becomes i=n and each time it becomes $q=q_{max}$ in line searches at step 7, line searches resume in the steepest descent direction.

In the embodiment described above, if the condition (1) or (2) becomes unsatisfied at the first time at a search point $\eta_q$ at the q-th (q: integer 2 or larger) line search, i.e., if a difference between weight norm layer averages at the search start point and the search point $\eta_q$ becomes equal to, or larger than the upper limit $\kappa$ at any one of layers, or it becomes $E(\eta_{q-1}) < E(\eta_q)$, then the previous search point $\eta_{q-1}$ is considered as a minimum error point and the present line searches are terminated to resume new line searches in the next conjugate direction.

If the condition (1) or (2) becomes unsatisfied at the first search point $\eta_1$, i.e., if a difference between weight norm layer averages at the search start point and the search point $\eta_1$ becomes equal to, or larger than, the upper limit $\eta$ at any one of layers, or it becomes $E(\eta_0) < E(\eta_1)$, then the minimum error point is obtained while sequentially using a shorter step length than the length $dh_0$ between $\eta_1$ and $\eta_0$, under the condition (1) $\Delta|w^k\eta(q)| < \kappa$ and the condition (2) $E(\eta_0) \geq E(\eta_q)$. In this case, when the number of searches reaches a predetermined number, the present line searches are terminated to resume new line searches in the steepest descent direction.

In the above embodiment, if a difference between weight norm layer averages at the search start point $\eta_0$ and the search point $\eta_q$ becomes equal to, or larger than, the upper limit $\kappa$ at any one of layers, the control advances to the step 20. Instead, the weight norm averages for all layers in a neural network may be compared at the search points $\eta_q$ and $\eta_0$, and if a difference of such weight norm averages is equal to, or larger than the upper limit $\kappa$, the control advances to the step 20.

The upper limit $\kappa$ of a difference between weight norm layer averages may be changed for each learning.

Figure 18:
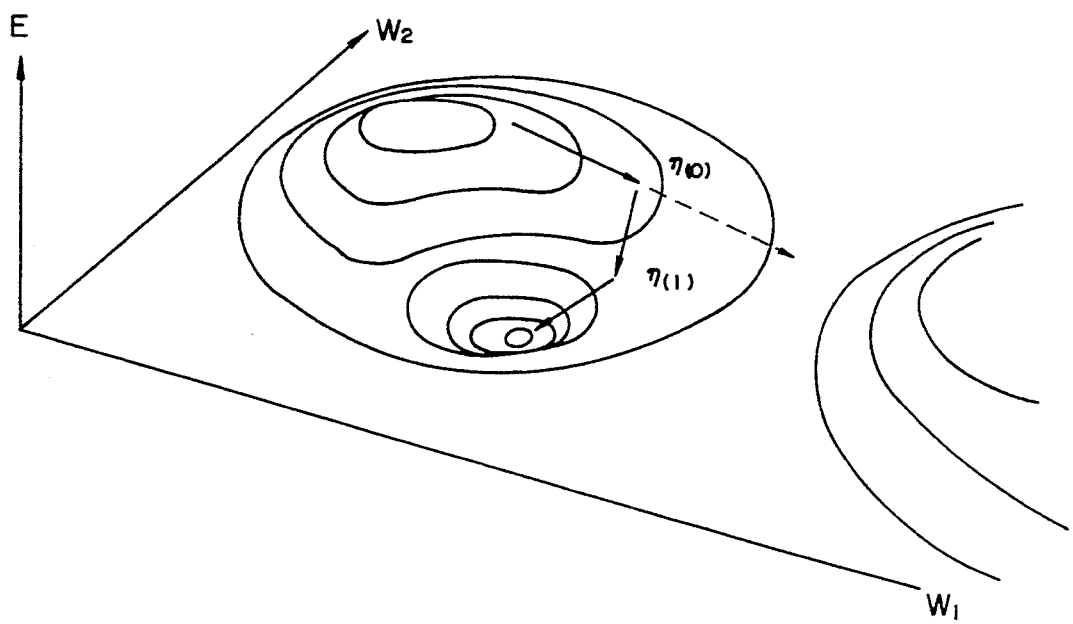
FIG. 18 is a diagram showing a still further example of line searches according to the one embodiment.
Figure 19:
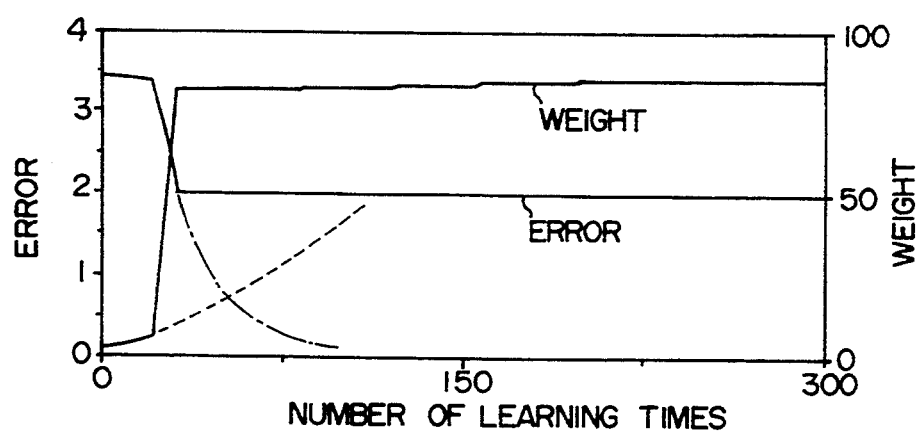
FIG. 19 is a diagram showing the relationship between learning and error according to the one embodiment.

According to the embodiment described above, a minimum error point is obtained under the condition that a difference between weight norm layer averages at the line search start point and the present search point is below a predetermined value. Therefore, line searches are performed as indicated by solid arrows in FIG. 18. High speed learning without protracting is possible while reliably reaching the global minimum error point, as indicated by a one-dot-chain line and broken line shown in FIG. 19. A broken line arrow shown in FIG. 18 illustrates conventional line searches whereby an error is reduced by using a large weight norm, and so learning is protracted as indicated by solid lines in FIG. 19, reaching a local minimum error point (at the distal point of the broken line shown in FIG. 19).

An example of the structure of an apparatus according to the above-described embodiment will be described with reference to FIG. 20.

Figure 20:
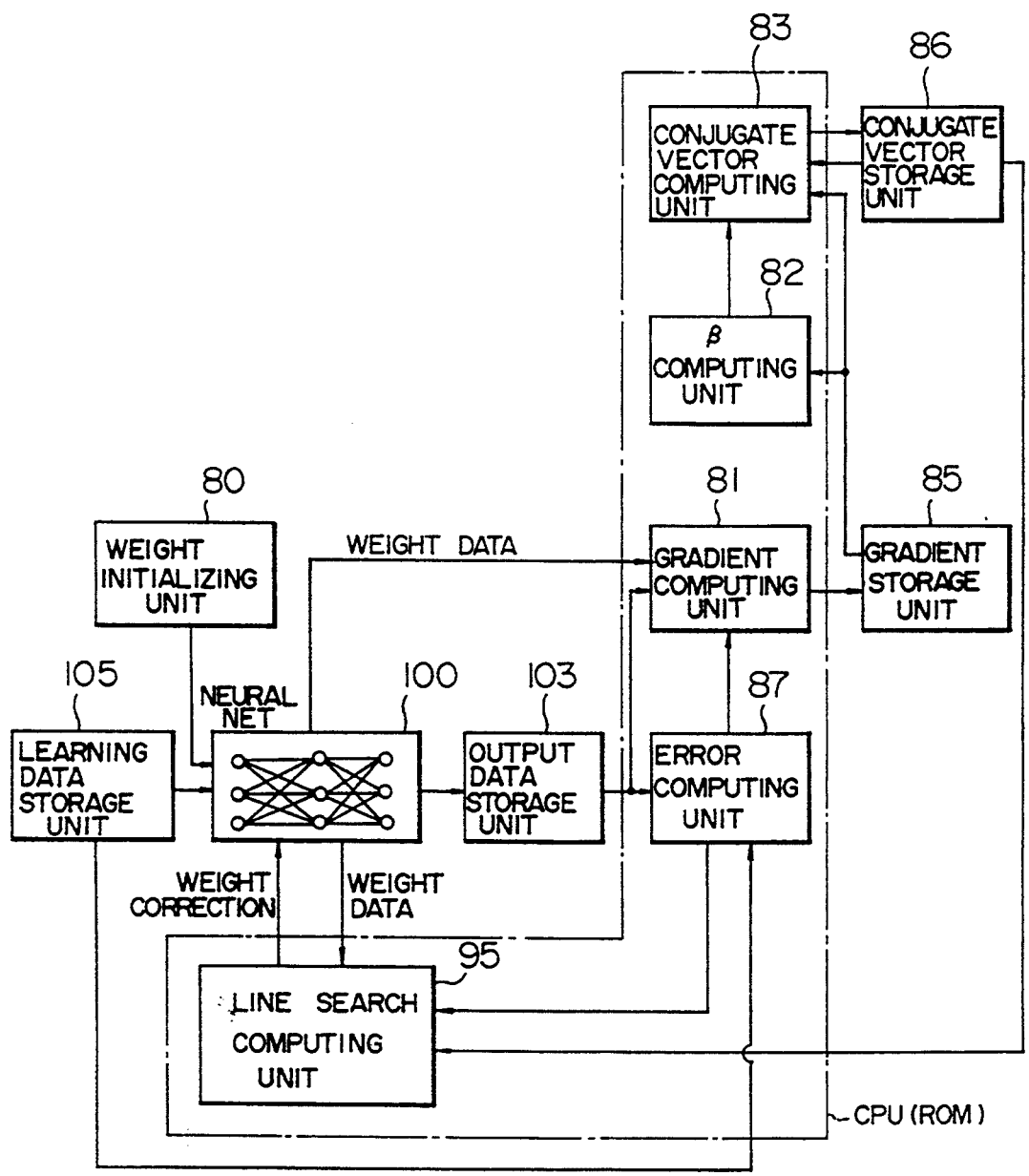
FIG. 20 is a block diagram showing an example of the structure of the one embodiment.

FIG. 20 is a block diagram showing an example of the overall structure of the apparatus according to the above-described embodiment.

In FIG. 20, a neural network 100 may be constructed of a neural net chip. Computing units 81 to 83, 87 and 95 surrounded by a one-dot-chain line may be constructed of a central processing unit (CPU) and a read-only memory (ROM). Storage units 85, 86, 103 and 105 may be constructed of random access memories (RAMs).

The neural network 100 reads input data from a learning data storage unit 103, and calculates output data in accordance with weights stored in the neural network 100. The calculated output data is stored in an output data storage unit 109.

An error computing unit 87 reads the output data from the output data storage unit 103 and desired output data from a learning data storage unit 105, to thereby calculate errors of the output data relative to desired output data.

A gradient computing unit 81 reads the weight data from the neural network 10, the output data from the output data storage unit 103, and the errors from the error computing unit 87. Using these read-out data, the gradient computing unit 81 calculates a gradient and stores it in a gradient storage unit 85.

A $\beta$ computing unit 82 reads the gradient data from the gradient storage unit 85, and calculates a value $\beta$ indicating a ratio of the previous conjugate vector to be added to the gradient.

A conjugate vector (direction) computing unit 83 reads the gradient data from the gradient storage unit 85, the value $\beta$ from the $\beta$ computing unit 82, and the conjugate vector data at the previous line search from the conjugate vector storage unit 86. Using these read-out data, the conjugate vector (direction) computing unit 83 calculates the present line search conjugate vector and stores it in the conjugate vector storage unit 86.

A line search computing unit 95 reads the conjugate vector data from the conjugate vector storage unit 86 and the weight data from the neural network 100, and calculates a minimum error point in the conjugate direction under the condition that an increase of a weight norm layer average from that at the search start point is equal to, or smaller than, a predetermined threshold value.

The above operation is repeated until the learning is concluded (ended). At the end of learning, there is obtained a position (weights) in the weight space having a minimum global error.

Figure 21:
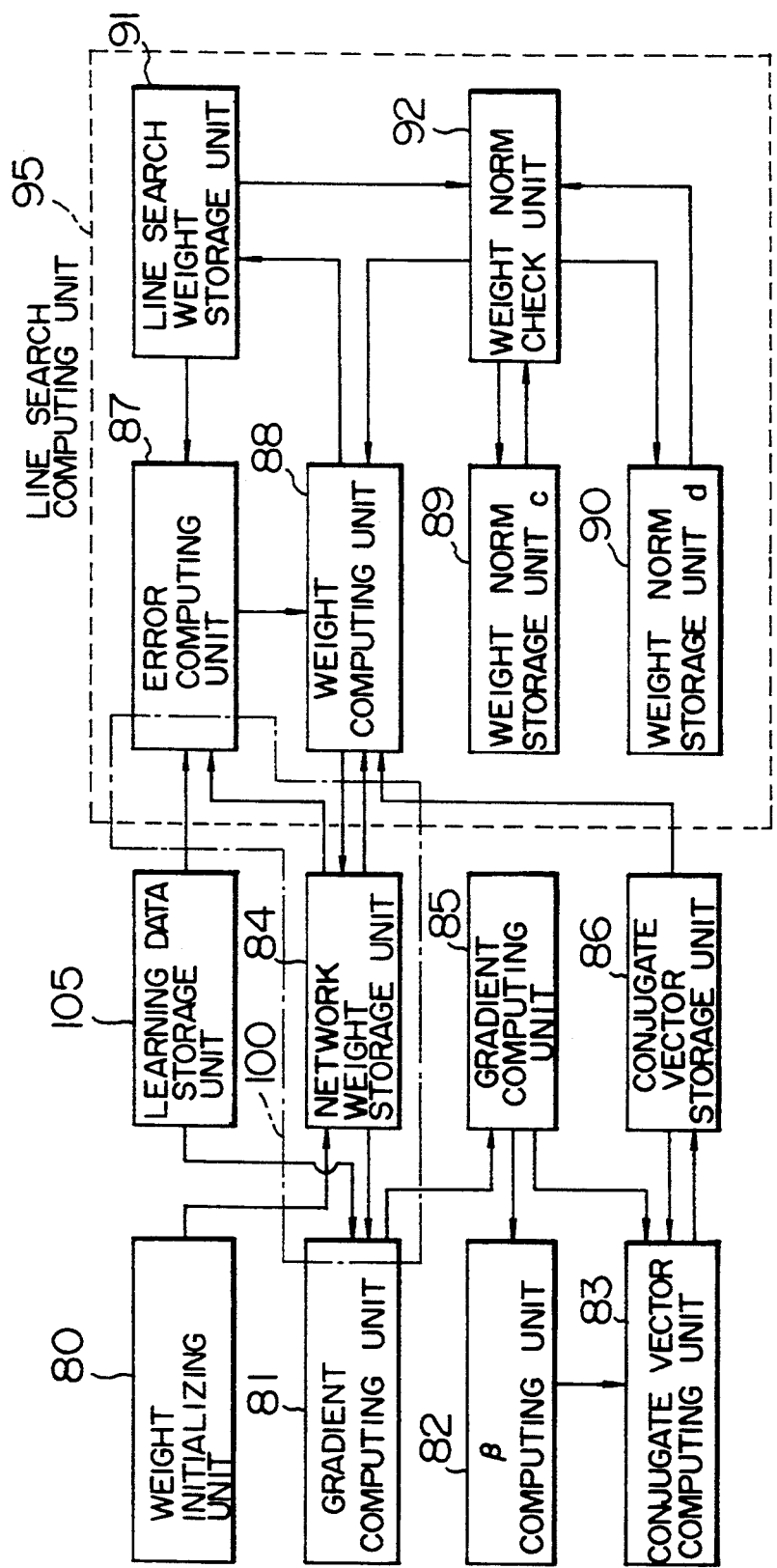
FIG. 21 is a block diagram showing the function of the one embodiment structure shown in FIG. 20.

FIG. 21 shows the function of the overall structure of the apparatus shown in FIG. 20.

In FIG. 21, a network weight storage unit 84, part of the gradient computing unit 81 and part of the error computing unit 87, respectively surrounded by a one-dot-chain line, constitute the neural network 100. The output data storage unit 103 shown in FIG. 20 is provided in the gradient computing unit 81 and error computing unit 87. The error computing unit 87 shown in FIG. 20 is provided in the line search computing unit 95 shown in FIG. 21.

The operation of the apparatus shown in FIG. 21 will be described in detail while referring to the flow charts shown in FIGS. 12 and 13 including steps 1 to 9 and 15 to 29.

At step 1, a weight initializing unit 80, e.g., an input terminal equipment, supplies an initial value of weight by using a random number for example, the initial value being stored in the network weight storage unit 84.

At step 2, the gradient computing unit 81 reads the learning data stored in the learning data storage unit 105 and the weight data stored in the network weight storage unit 84, to calculate a gradient of weight errors in the manner described previously. The calculation result is stored in the gradient storage unit 85.

At steps 3, 4 and 5, the $\beta$ computing unit 82 calculates the ratio $\beta(i)$ of the previous line search conjugate vector to be added to the gradient at the search start point of the present line search, in order to generate the conjugate vector of the present line search. If i mod n=0, then the $\beta$ computing unit 82 resets $\beta(i)$ to 0 at step 4. If i mod n is not 0, it reads the gradient data from the gradient storage unit 85 and calculates $\beta(i)$ at step 5 using the expression (10). The reason why the $\beta$ computing unit 82 resets $\beta(i)$ to 0 is that the line search is required to resume in the steepest descent direction every n-th time (n is the number of all weights in the network) in order to prevent convergence from worsening.

At step 6, the conjugate vector (direction) computing unit 83 reads the gradient data from the gradient storage unit 85 and the previous conjugate vector data from the conjugate vector (direction) storage unit 86, and calculates the present line search conjugate vector by using the expression (9) and using the ratio $\beta(i)$ calculated by the $\beta$ computing unit 82. The calculated conjugate vector is stored in the conjugate vector storage unit 86.

At step 7, a minimum error point $\beta(i)$ present on a line in the conjugate direction is obtained through line searches in the conjugate direction indicated by the conjugate vector. This minimum error point is obtained under the condition that an increase of a weight norm layer average from that at the line search start point does not exceed a predetermined threshold value $\kappa$, for each of all layers. The line search operation at the step 7 will be described in detail with reference to the flow chart shown in FIG. 13.

At step 15, an initial step length $dh_0$ from the search start point $\eta_0$ is set for line searches, a weight norm layer average at the search start point at each layer given by the expression (17) is calculated, and an error $E(\eta_0)$ at the search start point $\eta_0$ is calculated. First, the weight computing unit 88 sets the initial step length $dh_0$ for line searches. Thereafter, it reads the weight data from the network weight storage unit 84, uses it as the weight at the search start point $\eta_0$, and stores it in the line search weight storage unit 91. A weight norm check unit 92 reads the weight data from the line search weight storage unit 91 to calculate a weight norm layer average, and stores the calculated result in a weight norm storage unit c 89. The error computing unit 87 reads the learning data stored in the learning data storage unit 105 and the weight data stored in the network weight storage unit 84, to calculate an error $E(\eta_0)$ at the search start point $\eta_0$.

At step 16, new weights are generated at the step position $\eta_1$ spaced apart from the search start point $\eta_0$ by the initial step length $dh_0$. The weight norm layer average is then calculated for each layer. A difference between the weight norm layer average at the start point and the calculated weight norm layer average is obtained for each layer. The error $E(\eta_1)$ is calculated for the newly generated weights.

First, the weight computing unit 88 reads the weight data from the network weight storage unit 84 and the conjugate vector data from the conjugate vector storage unit, to calculate the weights at the point $\eta_1$ and store them in the line search weight storage unit 91. Next, the weight norm check unit 92 reads the weights data from the line search weight storage unit 91, to calculate the weight norm layer average for that weight and store it in a weight norm storage unit d 90. Then, the weight norm check unit 92 reads the weight norm layer average at the start point $\eta_0$ from the weight norm storage unit c 89 and the weight norm layer average at the point $\eta_1$ from the weight norm storage unit d 90, to calculate a difference between the weight norm layer averages for each layer. The error computing unit 87 reads the learning data stored in the learning data storage unit 105 and the weight data stored in the line search weight storage unit 91, to calculate an error $E(\eta_1)$.

At step 17, it is judged by the weight computing unit 88 whether the difference between weight norm layer averages calculated by the weight norm check unit 92 at the step 16 is smaller than an upper limit $\kappa$ for each layer and whether the error at the point $\eta_1$ is equal to, or smaller than, the error at the start point $\eta_0$. Namely it is judged whether the conditions (1) and (2) are satisfied. If the conditions (1) and (2) are satisfied, the control advances to step 18, If not, the control advances to step 20.

At steps 18 to 24, there is obtained a new step position $\eta$ by using a longer step length to obtain a minimum error, under the condition that a difference of the norm weight layer average from that at the search start point is smaller than the upper limit $\kappa$, i.e., under the condition (1).

At step 22, the weight computing unit 88 changes the step length to a longer step length, e.g., two times longer than the initial step length. The new step length is added to $\eta_0$ to obtain a new step position $\eta$. The weight computing unit 88 then reads the weight data from the network weight storage unit 84 and the conjugate vector data from the conjugate vector storage unit 86, to calculate the weights at the new point and store them in the line search weight storage unit 91.

At step 23, a difference between weight norm layer averages at the new point and the start point is calculated using the new weights at the new point. First, the weight norm check unit 92 reads the weight data from the line search weight storage unit 91, to calculate the weight norm layer average for the new weight and store it in the weight norm storage unit d 90. Thereafter, the weight norm layer average at the start point $\eta_0$ is read from the weight norm storage unit c 89 and the weight norm layer average at the point $\eta$ is read from the weight norm storage unit d 90, to calculate a difference between weight norm layer averages for each layer.

At step 24, the error computing unit 87 reads the learning data stored in the learning data storage unit 105 and the weight data stored in the line search weight storage unit 91, to calculate the error for the new weights.

At the step 18, it is judged whether the difference between weight norm layer averages is smaller than K and the error is equal to, or smaller than, the previous error. Namely it is judged whether the conditions (1) and (2) are satisfied. If satisfied, steps 22 to 24 are repeated.

At step 19, the position $\eta_q$ considered by the weight computing unit 88 as the minimum error point is uses as $\eta(i)$ for weight correction.

At steps 20 to 27, there is obtained a new step position $\eta$ by using a shorter step length to obtain a minimum error, under the conditions (1) in which the difference between weight norm layer averages at the search start point $\eta_0$ and the present search point is equal to, or smaller than, the upper limit $\kappa$ for each layer. The details of this will be described below.

At step 25, the weight computing unit 88 changes the step length to a shorter step length, e.g., $(\frac{1}{2})^q * dh_0$, to obtain a new step length $\eta_{q+1}$. The weight computing unit 88 reads the weight data from the network weight storage unit 84 and the conjugate vector data from the conjugate vector storage unit 86, to calculate the weights at the point $\eta_{q+1}$ and store them in the line search weight storage unit 91.

At step 26, similar to the operation described at the step 23, the weight norm check unit 92 calculates a difference between weight norm layer averages at the position $\eta_q$ and the start point using the new weights at the position $\eta_{q+1}$.

At step 27, the error computing unit 87 calculates an error $E(\eta_{q+1})$ for the new weights.

At the step 20, it is judged if the difference between weight norm layer averages is equal to, or smaller than the upper limit $\kappa$, or the error is smaller than the previous error, i.e., if the condition (1) or (2) is not satisfied. If the condition is not satisfied, the steps 25 to 27 are repeated within the range of $q \leq q_{max}$. A limitation $q \leq q_{max}$ is intended to prevent line searches with an infinitely short step, because a minimum error point will not be found in a wrong line search direction.

At step 21, if $q = q_{max}$, it is assumed that a wrong line search direction was used, and the weight computing unit 88 sets the point $\eta(i)$ used for weight correction to 0 to resume line searches again in the steepest descent direction. If q is not equal to $q_{max}$, the $\eta_q$ searched at the step 29 is used as $\eta(i)$ for weight correction.

Upon execution of the step 7 detailed above, a minimum error point $\eta(i)$ can be obtained under the condition that an increase of a weight norm layer average from that at the search start point is equal to, or smaller than the upper limit $\kappa$.

At step 8, the weight computing unit 88 reads the weight data from the network weight storage unit 84 and the conjugate vector data from the conjugate vector storage unit 86, to renew the weights using $\eta(i)$ obtained at the step 21 and store them in the network weight storage unit 84.

At step 9, the steps 2 to 8 are repeated until output errors become below a predetermined error upper limit used as a standard for learning completion.

As appreciated from the foregoing detailed description of the above embodiment, a predetermined upper limit is provided for an increase of weights in the conjugate gradient method. Therefore, it is possible to prevent a rapid increase of weights and to renew weights while solving a tradeoff between rotation of a hyperplane and steep rise of a sigmoid function. It is therefore possible to provide learning at a higher speed than back-propagation.

The definition of a weight norm is not limited only to the above embodiment. For example, the norm may be defined by the following equations:

$$|W_j^k| = \sum_{m=1}^{n_k-1} |W_{jm}^k| \quad (20)$$

$$|W_j^k| = \sum_{m=1}^{n_k-1} (W_{jm}^k)^2 \quad (21)$$

Furthermore, the definition of a weight increase is not limited only to the above embodiment. For example, instead of a weight norm layer average, a maximum value of an increase of norms at each neuron may be used.

The results of bench mark tests for the learning method of the above embodiment and the learning method using back-propagation are given below together with the advantages over the back-propagation learning method. As a comparison standard, a CPU time of a computer and a ratio of successful learning were used. The term "successful learning ratio" herein used means a ratio of the number of learning times satisfied the learning end condition to the number of all learning times performed using a plurality of initial weights. The learning end condition was set to a condition that an error of each output layer neuron becomes equal to, or smaller than, 0.1 for all learning patterns. The following two learning problems were used for comparison between the two methods.

(1) 16 bit encoder
(2) character recognition (0 to 9, 1377 patterns)

For the 16-bit encoder problem, sixteen patterns with one neuron taking "1" and other neurons taking "0" at the input and output layers were used, with a reduced number of hidden layer neurons for information compression.

FIG. 22 shows the number of units at each layer, the number of learning patterns, and the number of learning times performed by using a different initial weight to measure the average of CPU times and the successful learning ratio.

Parameters for the back-propagation learning method were obtained at a fixed moment coefficient 0.9 and by adopting learning coefficients having a shortest learning time. For the present invention learning method, the upper limit $\kappa$ for weight increase was fixed to 0.4.

The results of bench mark tests for the present invention learning method and the back-propagation learning method applied to a 16-bit encoder are shown in FIGS. 23A and 23B, and the results applied to a character recognition problem are shown in FIGS. 24A and 24B. In these figures, reference numeral 1 stands for the present invention learning method, and reference numeral 2 stands for the back-propagation learning method.

In FIG. 24A showing the results of CPU time bench mark tests, the bar with a waved top for the back-propagation learning method means that the learning concluded unsuccessful. The present invention learning method was 1.5 to 10 times faster than the back-propagation method in CPU time bench mark tests, and was faster also for the successful learning ratio. For a conventional conjugate gradient method, learning was protracted after learning 30 times (2.8 seconds) for a 16-bit encoder, and 3 times (1756 seconds) for a character recognition problem.

The above bench mark test results can be reasoned from a solution of a tradeoff between rotation of a hyperplane and steep rise of a sigmoid function by the provision of a predetermined limit range of a difference between weight norm averages at the search start point and the present line search point.

As described above, according to the present invention, a rapid increase of weights in the conjugate gradient method can be avoided. It is therefore possible to renew weights while solving a tradeoff between rotation of a hyperplane and steep rise of a sigmoid function, and to provide learning at a higher speed than back-propagation.

Furthermore, the number of error calculations in line searches can be reduced. Specifically, the judgment steps 18 and 20 shown in FIG. 13 are executed prior to a judgment of whether an increase in weight norm average is smaller than the upper limit $\kappa$, so that unnecessary error calculations can be avoided. For example, in the case shown in FIG. 14B, error calculations at point $\eta_4$ are unnecessary.

In the above embodiment, line searches are carried out by the conjugate gradient method. Instead, all line searches may be carried out in the steepest descent direction under the condition (1). All line searches may be carried out by the Quasi-Newton method.

In this case, the learning method for neural networks includes a step of supplying initial weight values of a neural network and supplying an initial approximation matrix of a positive symmetry Hessian inverse matrix, a step of obtaining a gradient of errors relative to neuron weights, a step of obtaining an approximation matrix of a Hessian inverse matrix by using a Broyden-Fletcher-Goldfarb-Shanno (BFGS) method, a step of generating a next search direction basing upon a product of the gradient relative to neuron weights and the approximation matrix of the Hessian inverse matrix, a step of obtaining an error minimum point under the condition that a difference between neuron weight norm averages at the line search start point and present search point is smaller than a predetermined value, and a step of renewing errors in accordance with the error minimum point.

As an approximation method, in addition to the BFGS method, a Davidson-Fletcher-Powell (DFP) method may also be used.

Figure 25:
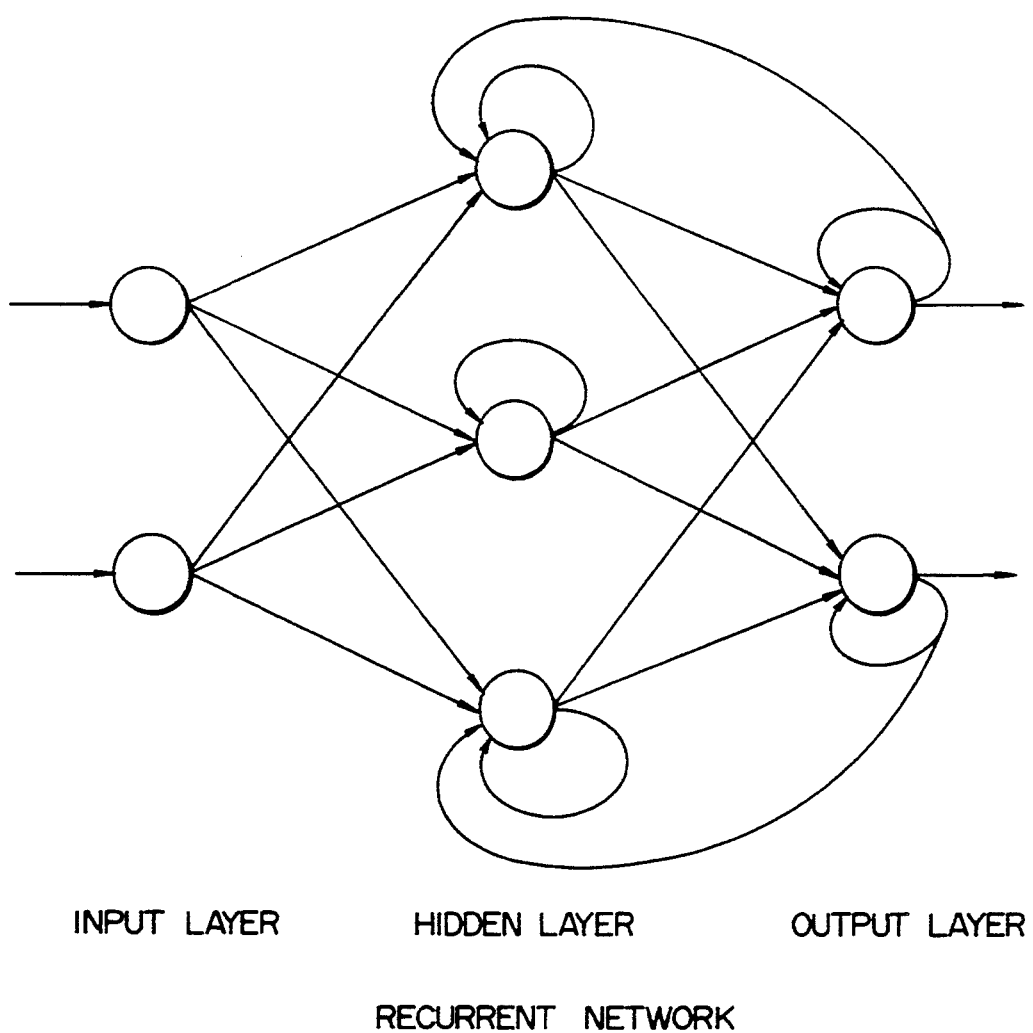
FIG. 25 is a diagram showing an example of a recurrent neural network to which the present invention is applied.

In the above embodiment, a multi-layer neural network has been used. The present invention is applicable to a recurrent neural network such as shown in FIG. 25. A recurrent neural network is a network having inter-layer feedback, intra-layer feedback, or arbitrary feedback connections.

In such a network, input, hidden and output layers are considered as input, hidden and output layers of a multi-layer neural network, to obtain a weight norm layer average in the similar manner described with the above embodiment.

Next, an embodiment of a simulator with a neural network applied with the present invention learning method, will be described with reference to FIG. 26.

Figure 26:
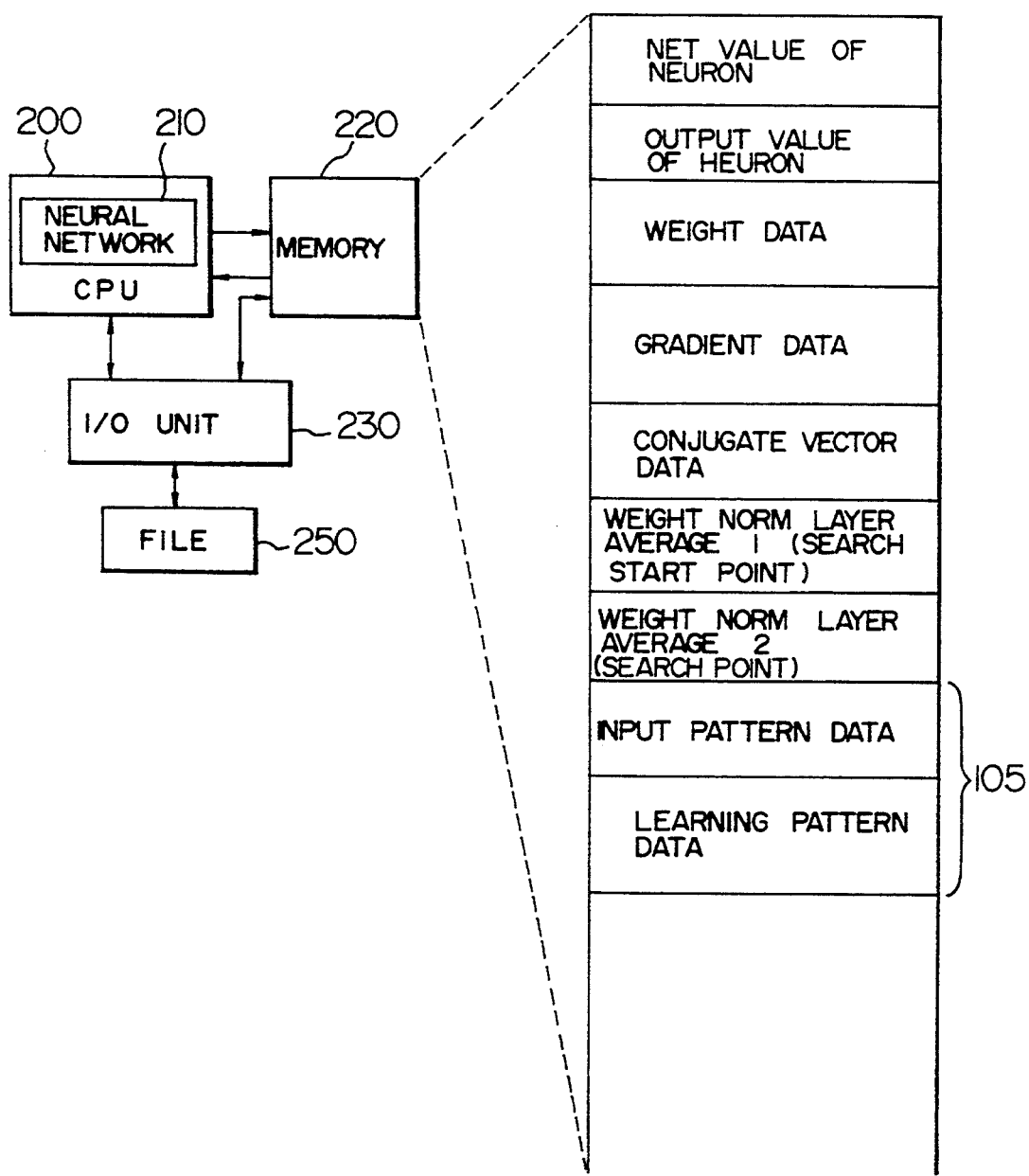
FIG. 26 is a block diagram showing an example of a simulator according to another embodiment of the present invention, the learning method for neural networks of the present invention being applied to the simulator.

In FIG. 26, a neural network 210, a CPU 200 and a memory 220 correspond to the neural network 100, CPU and RAM shown in FIG. 20. A memory 250, e.g., a file, stores the learning results, and may use a magnetic disc. In this embodiment, there is further provided an input/output (I/O) unit 230 for supplying learning data for simulation to the neural network 100, storing the learning data in the memory 220, or performing other necessary operations. This simulator operates in the following manner. Although the neural network used in this simulator is a multi-layer neural network, a recurrent neural network may also be used.

CPU reads an input pattern and weight data from the memory 220 at its input pattern data area and weight data area, calculates net values and output values at the second layer, and stores the calculated values in the memory 220 at its net value area and output value area. In this manner, net values and output values of the next layer are calculated by reading the output values and weight data at the second layer from the memory at its output value area and weight data area. This operation is repeated up to the output layer.

CPU reads the output values at the output layer and desired output data from the memory 220 at its output value area and desired pattern data area, and calculates errors therebetween.

CPU reads the output values and weight data from the memory 220 at its output value area and weight data area, to calculate a gradient and store it in the memory at the gradient data area.

CPU reads the gradient from the memory 220 at its gradient data area, to calculate $\beta$.

CPU reads the gradient and the previous conjugate vector from the memory 220 at its gradient data area and conjugate vector data area, to calculate the next conjugate vector and store it in the memory 220 at its conjugate vector data area.

CPU reads the weight data from the memory 220 to calculate a weight norm layer average and store it in the memory 220 at its weight norm layer average area 1.

CPU reads the conjugate vector, the weight norm layer average at the search start point and the weight data, from the memory 220 respectively at its conjugate vector data area, weight norm layer average area 1 and weight data area. CPU then calculates a minimum error weight under the condition that an increase of a weight norm layer average from that at the search start point in the conjugate direction is smaller than a predetermined threshold value.

The above operations are repeated until the end of learning. Weights at the end of learning are stored in the file 250 via the I/O unit 230.

Such simulation may be applied to forming portfolios in stock markets, or to other fields.

In the application to stock markets, learning data is first provided from actual stock values which are then stored in the memory 220 via the I/O unit 230 and learnt by the neural network 210. The learning results (weights) are stored in the file 250.

Next, test data for stock value prediction is supplied to the neural network 210 via the I/O unit 230. The neural network 210 then predicts stock values for the test data, by using the learning results stored in the file 250.

The predicted results are outputted from the I/O unit 230.

Figure 27A:
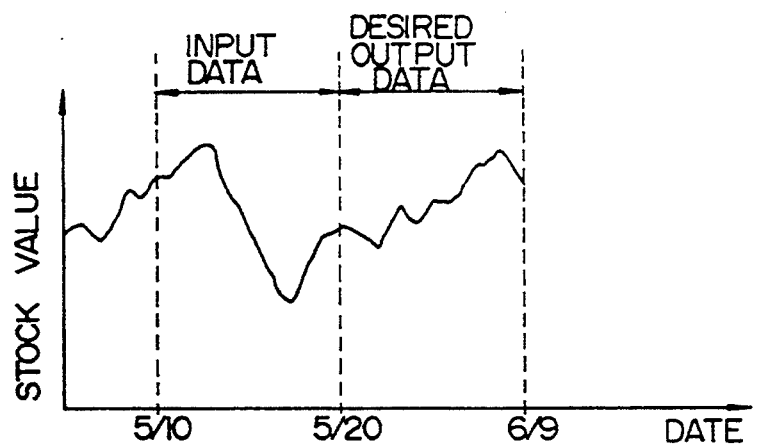
FIGS. 27A and 27B are diagrams showing a display example of learning data and prediction results by the simulator shown in FIG. 26.
Figure 27B:
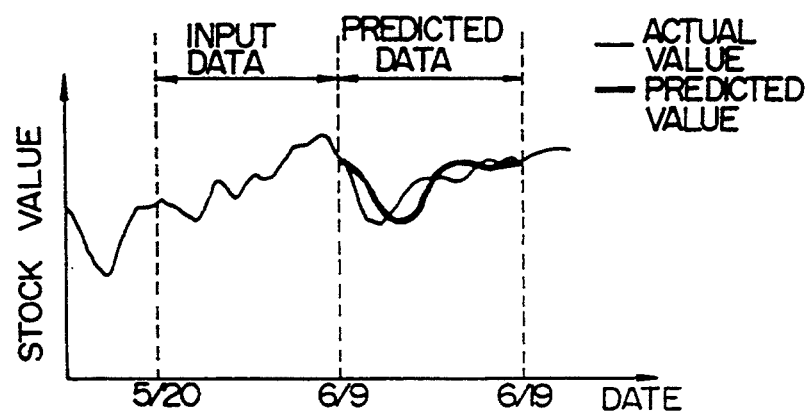

FIGS. 27A and 27B show examples of learning data and predicted results displayed on a display device (not shown).

We claim:

1. A learning machine comprising:

a neural network which operates on input data with weight values to calculate output data, the neural network including a weight value storing means for storing the weight values;

an error computing means which receives (i) the output data from the neural network and (ii) desired output data for calculating error values representing errors between the neural network output data and the desired output data;

a gradient computing means for calculating error gradient values from at least one of the weight values and neural network output data and the error values, the gradient computing means being connected with the weight value storing means, the neural network, and the error computing means;

a conjugate vector computing means for generating a present line search conjugate vector from the error gradient value and a previously calculated line search conjugate vector, the conjugate vector computing means being connected with the gradient computing means to receive the error gradient value therefrom;

a line search computing unit connected with the weight value storing means, the error computing means for receiving the error values therefrom, the gradient computing means for receiving the error gradient values therefrom, and the conjugate vector computing means for receiving the present line search conjugate vector therefrom, the line search computing unit including:

means for setting a line search direction based upon the error values from the error computing means, the present line search conjugate vector from the conjugate vector computing means, and the weight values at a search start point;

means for determining a present search point having a minimum error based on said error values from the error computing means, said present line search conjugate vector from the conjugate vector computing means, and the weight values at the present search point, during line searches, said present search point being determined under a limiting condition that a difference between weight values at said search start point and said present search point does not exceed a predetermined upper limit;

means for determining changes in weight values corresponding to said present search point and for changing the weight values stored in the weight value storing means accordingly; and means for determining as a next line search start point a sum of the weight values at said present search start point and said determined changes in the weight values.

2. A learning apparatus comprising:

a neural network which operates on input data with weight values to calculate output data, the neural network including a weight value storing means for storing the weight values;

an error computing means for calculating error value representing errors between the output data from the neural network and desired output data, the error computing means being connected with the neural network to receive the output data therefrom;

a gradient computing means for calculating an error gradient value from at least one of the output data and the weight values and the error values, the gradient computing means being connected with the neural network and the error computing means;

a conjugate vector computing means for generating a present line search conjugate vector from the error gradient value and a previously calculated line search conjugate vector, the conjugate vector computing means being connected with the gradient computing means;

a line search computing unit connected with the neural network the error computing means, the gradient commuting means, and the conjugate vector computing means the line search computing unit including:

means for setting a line search direction in accordance with learning data including the present line search conjugate vector and error values and weight values at a search start point;

means for determining a present line search point having a minimum error determined by said learning data and the weight values at the present line search point, during line searches, said present line search point being searched on a line in said set line search direction and determined under a condition that a difference between neuron weight norm layer averages at said start search point and said present line search point does not exceed a predetermined upper limit;

means for determining and making changes in weight values stored in the neural network weight value storing means corresponding to said obtained present line search point; and means for determining as a next line search start point a sum of the weight values at said present line search point and said determined changes in the weight values.

3. A learning apparatus comprising:

a neural network which operates on input data with current weight values to calculate output data, the neural network including a weight value storing means for storing the current weight values;

an error computing means for comparing the output data from the neural network and desired output data to calculate error values representing errors therebetween;

a gradient computing means for receiving the weight values from the neural network and the error values from the error computing means and for calculating an error gradient value therefrom;

a conjugate vector computing means for generating a present line search conjugate vector in accordance with the error gradient value;

a ratio computing means for obtaining a ratio of the present line search conjugate vector to a previously calculated line search conjugate vector and adding the ratio to said error gradient value, the ratio computing mean beings connected with the gradient computing means unit to receive the error gradient value therefrom and being connected with the conjugate vector computing means to supply the added ratio and error gradient value thereto;

a line search computing unit including:

means for determining a present start search point having a minimum error determined by said present line search conjugate vector and the weight values at the present start search point, said present start search point being searched on a line in conjugate direction indicated by said present line search conjugate vector at the present search start point and determined under a condition that:

a difference between neuron weight norm layer averages at said search start point corresponding and an initial weight value at said present start search point does not exceed a predetermined upper limit;

means for determining changes in weight values corresponding to said obtained present start search point; and means for determining as a next start search point a sum of the weight values at said present start search point and said determined changes in the weight values.

4. A learning machine comprising:

a neural network which operates on input data with current weight values to calculate output data, the neural network including a weight value storing means for storing the current weight values;

an error computing means for receiving the calculated output data from the neural network and desired output data and for calculating error values representing errors therebetween;

a gradient computing means for receiving the current weight values from the neural network and the error values from the error computing unit and calculating an error gradient value therefrom;

a conjugate vector computing means for generating a present line search conjugate vector from the error gradient value and a previously calculated line search conjugate vector;

a line search computing unit including:

a line search direction determining means for determining initial and subsequent search directions for searching for an error value minimum;

a weight correction value calculating means for performing a line search along the search direction to determine a weight correction value from the present line search conjugate vector;

a comparing means for comparing the weight correction value with a preselected maximum weight correction value; and a weigh value adjusting means for combining the smaller of the weight correction value and the maximum weight correction value with the weight values stored in the neural network weight value storing means.

5. The learning machine as set forth in claim 4 wherein the line search direction determining means includes a means for determining a line search direction in accordance with the conjugate vector.

6. The learning machine as set forth in claim 4 wherein the line search direction determining means includes a means for determining a line search direction in accordance with a steepest descent direction.

7. The learning machine as set forth in claim 4 wherein the line search direction determining means includes a means for implementing a quasi-Newton algorithm.

8. The learning machine as set forth in claim 4 further including a line step length changing means for changing a step length along the subsequent search direction after each adjustment of the weight value stored in the weight value storing means.

9. The learning machine as set forth in claim 8 wherein the line step length changing means makes the step length sequentially longer as a present search point becomes separated from a starting search point.

10. A learning machine comprising:

a neural network which operates on input data with current weight values to calculate output data, the neural network including a weight value storing means for storing the current weight values;

an error computing means for calculating error values representing errors between the calculated output data from the neural network and desired output data;

a gradient computing means for calculating an error gradient value from the current weight values from the neural network and the error values from the error computing means;

a conjugate vector computing means for generating a present line search conjugate vector from the error gradient value and a previously calculated line search conjugate vector;

a line search computing unit including:

a line search direction determining means for determining initial and subsequent search directions for searching for an error value minimum;

a means for calculating a weight correction value along the search direction from the present line search conjugate vector;

a comparing means for comparing the weight correction value with a preselected maximum weight correction value;

a weight value adjusting means for combining the smaller of the weight correction value and the maximum weight correction value with the weight values stored in the neural network weight value storing means;

a line step length changing means for changing a step length along the search direction after each adjustment of the current weight values stored in the weight value storing means, the line step length changing means shortens the step lengths in response to at least one of the weight correction value exceeding the preselected maximum weight correction value and the error value becoming larger than an initial error value.

11. A learning machine comprising:

a neural network which operates on input data with current weight values to calculate output data, the neural network including a weight value storing means for storing the current weight values;

an error computing means for comparing the output data from the neural network and desired output data to calculate a current error value representing deviation therebetween;

a gradient computing means for calculating an error gradient value in accordance with weight values from the neural network and the current error value from the error computing means;

a conjugate vector computing means for generating a present line search conjugate vector in accordance with the error gradient value and a previously calculated line search conjugate vector;

a line search computing unit including:

an initial weight computing means for setting a start search point and an initial step length for line searches and for computing weight adjustments from the current error value and the present line search conjugate vector;

a weight norm check means for calculating a current weight norm layer average in accordance with the present line search conjugate vector and the weight adjustments;

a means for determining a difference between a previously calculated weight norm layer average and a current weight norm layer average;

a means for determining whether the difference between the current and previous weight norm layer averages is smaller than a preset upper limit;

a line step length changing means for: (a) lengthening step length in response to: (i) the current error value being equal to or smaller than a previous search point error value and (ii) the weight norm layer average difference being smaller than the preset upper limit and (b) shortening the step length in response to one of (i) the current error value being larger than the start search point error value and (ii) the weight norm layer average difference exceeding the preset upper limit;

a means for adjusting the weight values stored in the weight value storage means in accordance with the lesser of the weight norm layer average difference and the preset upper limit.

12. The learning machine as set forth in claim 11 wherein the weight norm check means includes means for averaging weight norms of all layers of the neural network to calculate the weight norm layer average.

* * * * *

UNITED STATES PATENT AND TRADEMARK OFFICE
CERTIFICATE OF CORRECTION

PATENT NO. : 5,390,284
DATED : February 14, 1995
INVENTOR(S) : Hisao Ogata, et al.

It is certified that error appears in the above-indentified patent and that said Letters Patent is hereby corrected as shown below:

Claim 2, column 23, line 33, delete "value" and substitute therefor --values--;
                 line 51, after "network" insert --,--; and,
                 line 53, after "means" insert --,--.

Claim 3, column 24, line 39, before "conjugate" insert --a--.

Signed and Sealed this

Eighteenth Day of April, 1995

Attest:

BRUCE LEHMAN

Attesting Officer

Commissioner of Patents and Trademarks